(12) United States Patent
Fair et al.

(10) Patent No.: US 9,155,974 B2
(45) Date of Patent: Oct. 13, 2015

(54) PLAY MAT AND SYSTEM

(71) Applicant: The Boppy Company, LLC, Golden, CO (US)

(72) Inventors: Paul Fair, Denver, CO (US); Kristin A. Tidwell, Denver, CO (US); Catherine P. McNeil, Golden, CO (US); Clarice Bonzer, Littleton, CO (US)

(73) Assignee: The Boppy Company, LLC, Golden, CO (US)

( * ) Notice: Subject to any disclaimer, the term of this patent is extended or adjusted under 35 U.S.C. 154(b) by 15 days.

(21) Appl. No.: 13/921,020

(22) Filed: Jun. 18, 2013

(65) Prior Publication Data

US 2013/0280984 A1    Oct. 24, 2013

Related U.S. Application Data

(63) Continuation-in-part of application No. 12/827,768, filed on Jun. 30, 2010, and a continuation-in-part of application No. 12/827,823, filed on Jun. 30, 2010, and a continuation-in-part of application No. 12/827,870, (Continued)

(51) Int. Cl.
*A63H 33/00* (2006.01)
*B62B 9/26* (2006.01)
*B62B 3/14* (2006.01)

(52) U.S. Cl.
CPC ............ *A63H 33/006* (2013.01); *B62B 3/1448* (2013.01); *B62B 3/1456* (2013.01); *B62B 9/26* (2013.01); *B62B 3/1452* (2013.01)

(58) Field of Classification Search
USPC ........... 446/227, 487, 488, 71, 72, 73, 74, 76; 5/655, 417, 429, 657
See application file for complete search history.

(56) References Cited

U.S. PATENT DOCUMENTS

| 2,317,176 A | 4/1943 | Byrd |
| 2,442,105 A * | 5/1948 | Vacheron .......................... 2/69.5 |
| 2,884,638 A | 5/1959 | Ream |

(Continued)

FOREIGN PATENT DOCUMENTS

| EP | 1 031 364 A2 | 2/2000 |
| WO | 03/084369 A1 | 10/2003 |

(Continued)

OTHER PUBLICATIONS

International Search Report and Written Opinion of PCT/IB2010/002673 mailed on Oct. 8, 2011, 16 pages.

(Continued)

*Primary Examiner* — Michael Dennis
*Assistant Examiner* — Urszula M Cegielnik
(74) *Attorney, Agent, or Firm* — Kilpatrick Townsend & Stockton LLP

(57) ABSTRACT

A play mat is formed from a cushion material enclosed by fabric. A flexible rod-like element with a substantially continuous outer surface may be fixedly coupled to a portion of the mat. A slidable member is slidingly coupled with the rod-like element. In some cases, at least one article is coupled to the slidable member. The article includes a first item coupled to a second item by a length of material. The first item may be resilient so that the article is coupled to the slidable member when the first item is compressed and passed through an opening of the slidable member so that at least a portion of the length of material is positioned within the opening.

20 Claims, 23 Drawing Sheets

Related U.S. Application Data filed on Jun. 30, 2010, said application No. 12/827,768 is a continuation-in-part of application No. 12/619,481, filed on Nov. 16, 2009, now Pat. No. 8,460,053, said application No. 12/827,823 is a continuation-in-part of application No. 12/619,481, said application No. 12/827,870 is a continuation-in-part of application No. 12/619,481.

(56) References Cited

U.S. PATENT DOCUMENTS

| | | | |
|---|---|---|---|
| 3,073,367 A * | 1/1963 | Samara | 383/97 |
| 3,298,648 A | 1/1967 | Sepanski | |
| 3,665,880 A | 5/1972 | Ambrose | |
| D231,810 S | 6/1974 | Daley | |
| 4,654,991 A * | 4/1987 | Jones | 40/617 |
| 4,664,640 A * | 5/1987 | Shindo et al. | 446/227 |
| 4,805,937 A | 2/1989 | Boucher et al. | |
| 5,035,013 A * | 7/1991 | Bloom | 5/420 |
| 5,187,823 A * | 2/1993 | Ferguson et al. | 5/417 |
| 5,261,134 A | 11/1993 | Matthews | |
| 6,036,263 A | 3/2000 | Gold | |
| 6,038,720 A | 3/2000 | Matthews et al. | |
| 6,055,687 A | 5/2000 | Matthews | |
| 6,109,765 A | 8/2000 | Blanton | |
| 6,139,100 A | 10/2000 | Baskin-Lockman et al. | |
| 6,142,565 A | 11/2000 | Rieder | |
| 6,224,152 B1 | 5/2001 | Hughes et al. | |
| 6,247,730 B1 * | 6/2001 | Henderson et al. | 281/51 |
| 6,279,185 B1 | 8/2001 | Matthews | |
| 6,321,403 B1 | 11/2001 | Matthews | |
| 6,412,128 B1 | 7/2002 | Matthews | |
| 6,428,098 B1 | 8/2002 | Allbaugh | |
| 6,434,770 B2 | 8/2002 | Matthews Brown | |
| 6,442,759 B1 | 9/2002 | Straham, Jr. et al. | |
| 6,532,612 B2 | 3/2003 | Matthews Brown | |
| 6,640,977 B2 | 11/2003 | Matthews Brown et al. | |
| 6,671,908 B2 | 1/2004 | Brown et al. | |
| 6,685,024 B1 | 2/2004 | Matthews | |
| 6,702,381 B2 | 3/2004 | Endicott et al. | |
| 6,752,457 B2 | 6/2004 | Gold et al. | |
| 6,763,539 B1 | 7/2004 | Bartley et al. | |
| 6,785,921 B1 * | 9/2004 | Conforti | 5/655 |
| 6,857,150 B2 | 2/2005 | Matthews Brown et al. | |
| 6,938,958 B2 | 9/2005 | Gold et al. | |
| 6,944,898 B2 | 9/2005 | Matthews Brown et al. | |
| 6,966,089 B2 | 11/2005 | Gold et al. | |
| 7,000,275 B2 | 2/2006 | Matthews Brown et al. | |
| 7,000,766 B2 | 2/2006 | Matthews Brown et al. | |
| 7,017,212 B2 | 3/2006 | Matthews Brown | |
| 7,029,066 B1 | 4/2006 | Myers-Jones | |
| 7,055,196 B2 | 6/2006 | Littlehorn | |
| 7,062,807 B2 * | 6/2006 | Conforti | 5/655 |
| 7,089,639 B2 | 8/2006 | Matthews Brown et al. | |
| 7,127,760 B2 | 10/2006 | Bartley et al. | |
| 7,146,663 B2 | 12/2006 | Brown et al. | |
| 7,219,373 B2 | 5/2007 | McNamara | |
| 7,290,303 B2 * | 11/2007 | Mead et al. | 5/655 |
| 7,311,357 B2 | 12/2007 | Gold et al. | |
| 7,331,073 B2 | 2/2008 | Littlehorn et al. | |
| 7,374,240 B2 | 5/2008 | Gold et al. | |
| 7,404,222 B2 | 7/2008 | Tidwell | |
| 7,430,765 B2 | 10/2008 | Brown et al. | |
| 7,430,774 B2 | 10/2008 | Littlehorn et al. | |
| 7,451,508 B2 | 11/2008 | Matthews Brown et al. | |
| 7,461,421 B1 | 12/2008 | Faircloth et al. | |
| 7,472,443 B2 | 1/2009 | Littlehorn et al. | |
| 7,520,010 B2 * | 4/2009 | Welch | 5/655 |
| 7,587,773 B2 | 9/2009 | Littlehorn et al. | |
| 7,588,291 B2 | 9/2009 | Gold et al. | |
| 7,636,949 B2 | 12/2009 | Shooshan | |
| 7,788,752 B2 | 9/2010 | Tidwell et al. | |
| 7,810,191 B2 | 10/2010 | Littlehorn et al. | |
| 7,832,036 B2 | 11/2010 | Littlehorn et al. | |
| 8,336,173 B2 * | 12/2012 | Pontaoe et al. | 24/537 |
| 2002/0020021 A1 | 2/2002 | Milano et al. | |
| 2004/0232756 A1 | 11/2004 | Lin | |
| 2004/0242118 A1 | 12/2004 | Schreiber-Setzemski et al. | |
| 2004/0266312 A1 * | 12/2004 | Oren et al. | 446/227 |
| 2005/0036715 A1 * | 2/2005 | Delaney | 383/4 |
| 2005/0223492 A1 | 10/2005 | Littlehorn et al. | |
| 2005/0235425 A1 | 10/2005 | Parrilla | |
| 2006/0037274 A1 * | 2/2006 | Perez et al. | 52/646 |
| 2006/0043134 A1 * | 3/2006 | Delaney | 224/576 |
| 2006/0183397 A1 * | 8/2006 | Kanahele et al. | 446/26 |
| 2006/0232112 A1 | 10/2006 | Karr | |
| 2007/0122066 A1 * | 5/2007 | Landay | 383/16 |
| 2007/0192961 A1 | 8/2007 | Tidwell et al. | |
| 2008/0050050 A1 * | 2/2008 | Seecof | 383/4 |
| 2008/0258437 A1 | 10/2008 | Ryan et al. | |

FOREIGN PATENT DOCUMENTS

| | | |
|---|---|---|
| WO | 2005/020763 A2 | 3/2005 |
| WO | 2009/098678 A2 | 8/2009 |

OTHER PUBLICATIONS

International Search Report and Written Opinion for PCT/IB2010/002835 mailed on Apr. 1, 2011, 9 pages.
International Search Report and Written Opinion of PCT/IB2010/002836 mailed on Apr. 1, 2011, 10 pages.
International Search and Written Opinion of PCT/IB2010/002882 mailed on Apr. 1, 2011, 11 pages.

* cited by examiner

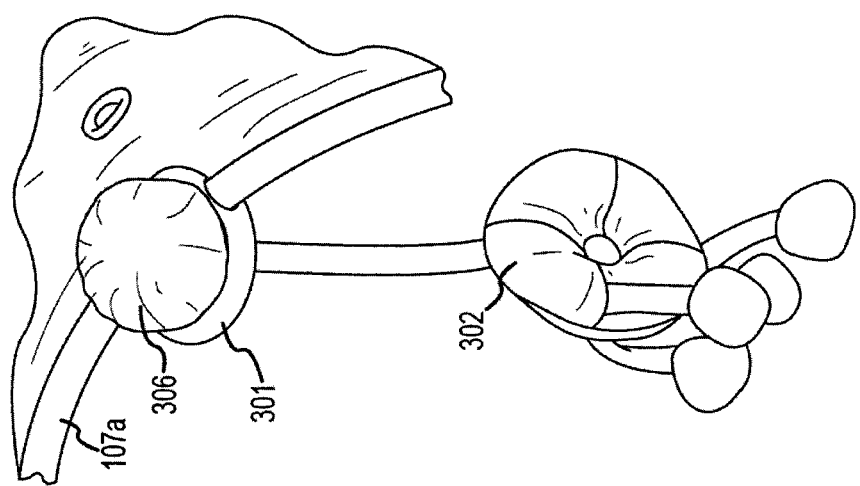

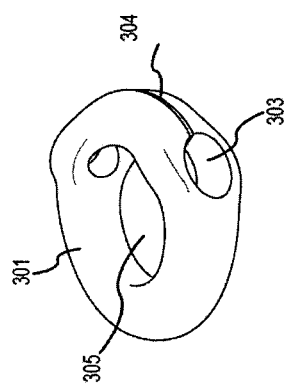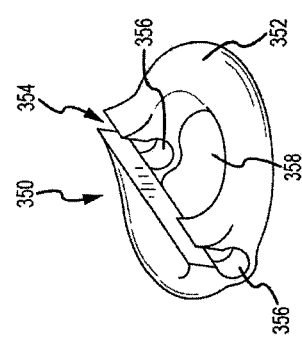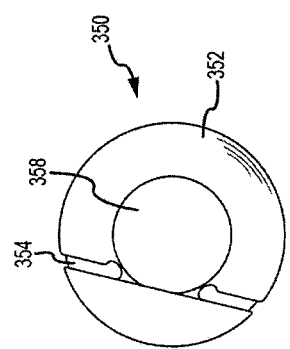

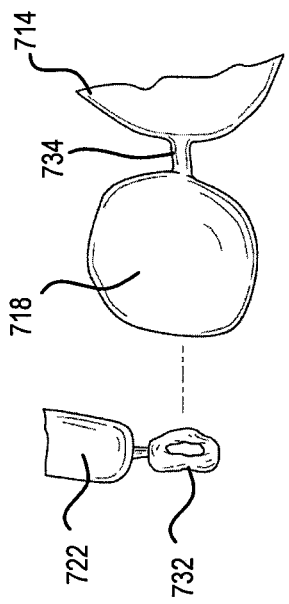
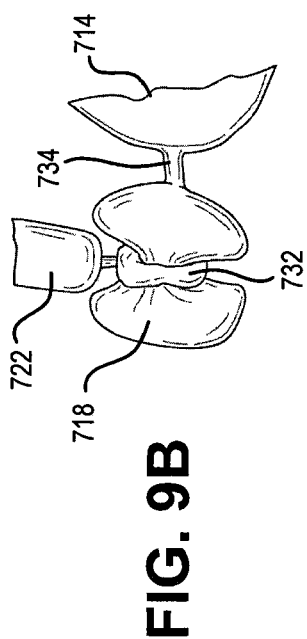
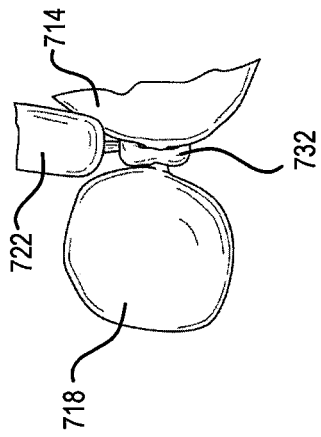
FIG. 9A
FIG. 9B
FIG. 9C

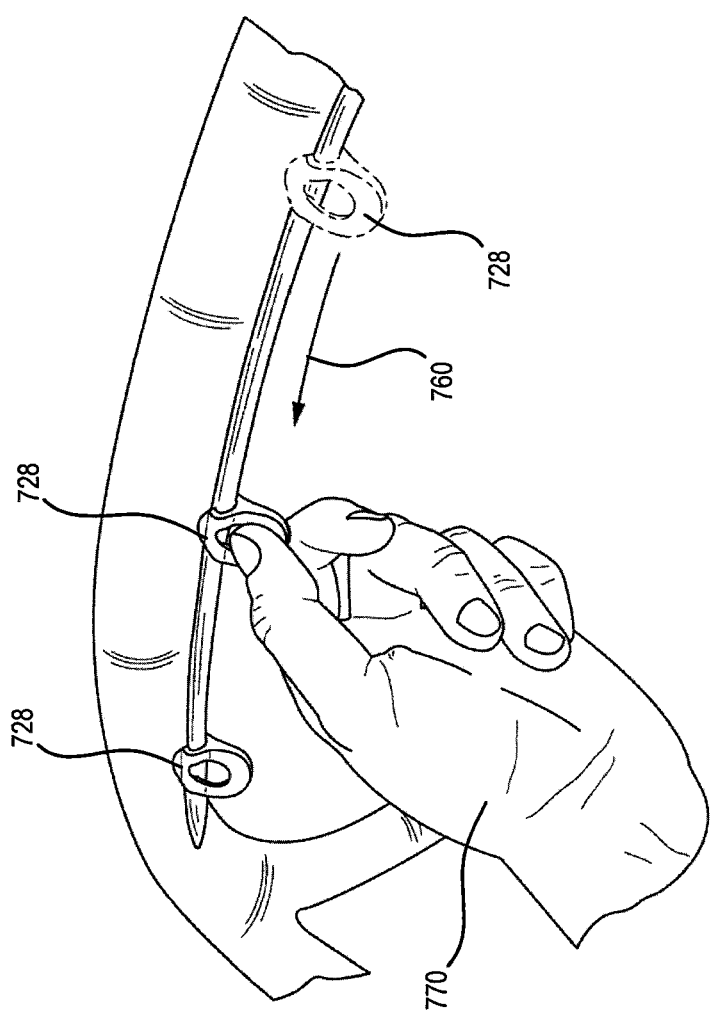

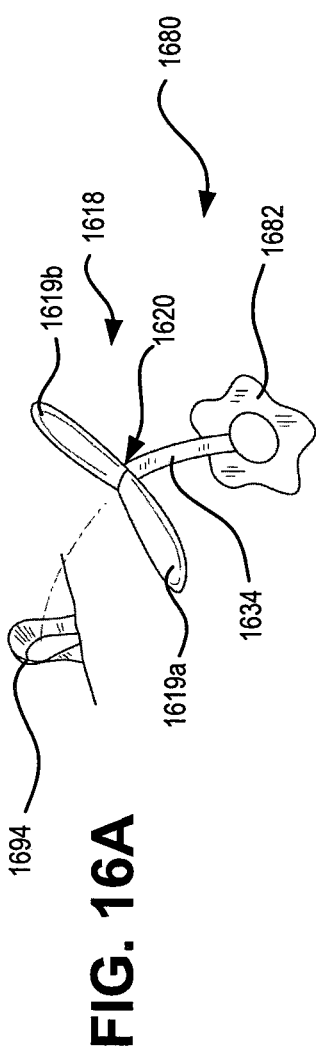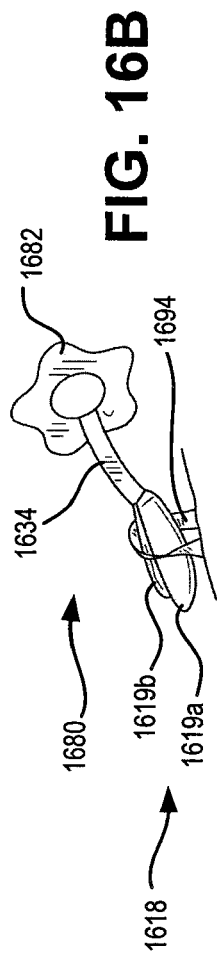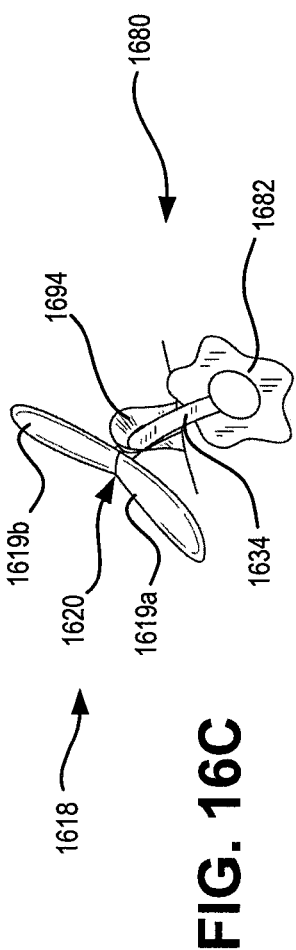

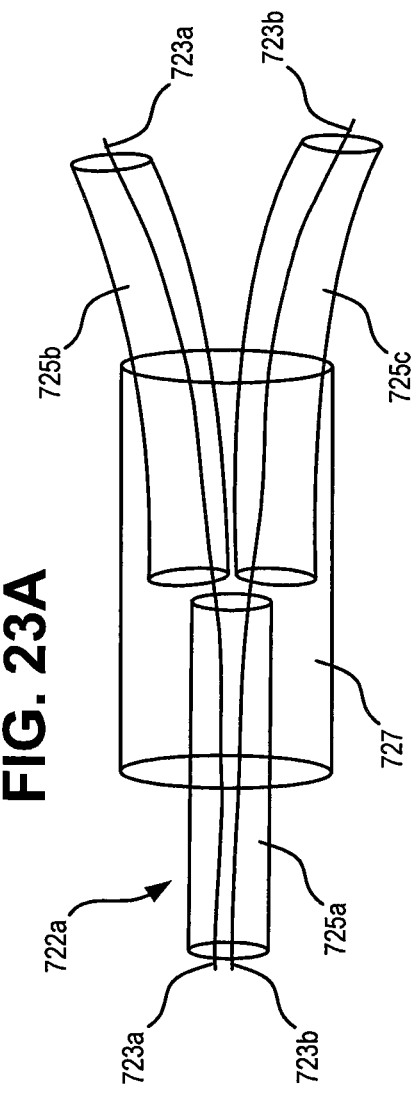
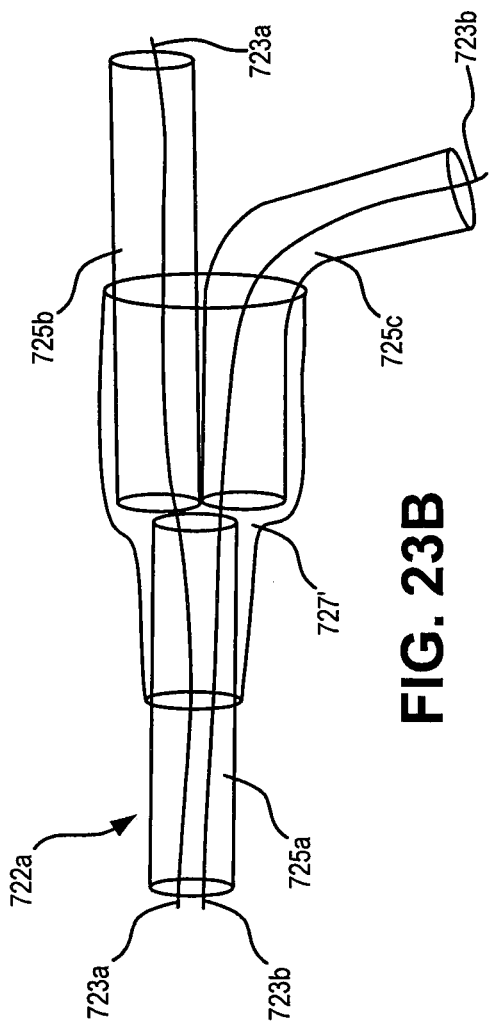
FIG. 23A
FIG. 23B

PLAY MAT AND SYSTEM

CROSS-REFERENCE TO RELATED APPLICATIONS

This application is a continuation-in-part of U.S. patent application Ser. No. 12/619,481, entitled "TOY ATTACHMENT SYSTEMS AND METHODS," filed Nov. 16, 2009. This application is also a continuation-in-part of U.S. patent application Ser. No. 12/827,768, entitled "SHOPPING CART LINER WITH TOY ATTACHMENT SYSTEM," filed Jun. 30, 2010. This application is also a continuation-in-part of U.S. patent application Ser. No. 12/827,823, entitled "STROLLER LINER WITH TOY ATTACHMENT SYSTEM," filed Jun. 30, 2010. The above three applications are each a continuation-in-part of U.S. patent application Ser. No. 12/827,870, entitled "PILLOW WITH TOY ATTACHMENT SYSTEM," filed Jun. 30, 2010. The entireties of all of the above patent applications are hereby incorporated by reference for all intents and purposes.

This application is related to U.S. patent application Ser. No. 13/920,955 entitled "BABY HOLDING AND ENTERTAINING APPARATUS," filed on even date herewith, the entirety of which is hereby incorporated by reference for all intents and purposes.

BACKGROUND

Various kinds of equipment and accessories have been developed for facilitating the care of infants and young children. While safety may be of primary importance, it is also desirable that child care equipment contribute to the mental and physical development of the child, provide stimulation and entertainment for the child, and be convenient to use.

SUMMARY

This Summary does not in any way limit the scope of the claimed subject matter.

In one embodiment, a child care equipment system is disclosed. The system may include a mat formed from a cushion material enclosed by fabric. A flexible rod-like element with a substantially continuous outer surface may be fixedly coupled to a portion of the mat. A slidable member (also referred to herein as a fastener because of the ability to fasten articles to it) may be slidingly coupled with the rod-like element. The system may include at least one article that includes a first item coupled to a second item by a length of material. The first item may be resilient so that the article is coupled to the slidable member when the first item is compressed and passed through an opening of the slidable member so that at least a portion of the length of material is positioned within the opening.

In another embodiment, a play mat includes a batting material that is enclosed by a first fabric. The play mat may include a rod-like element covered by a second fabric that is connected to the first fabric, although in some cases the rod-like element may not be covered with a fabric. The rod-like element may exhibit a substantially continuous and smooth outer surface. The play mat may include a slidable member or fastener including an opening and a slot. The slot may include a surface in contact with the second fabric so that the fastener is slidingly engaged with the rod-like element. The opening may be sized to permit an article to be coupled to the slidable member. For example, the article may be constructed of two items or elements that are connected by a length of material. The first item may be compressed and passed through the opening, with at least a portion of the length of material being positioned within the opening.

In yet another embodiment, a play mat may include a batting material enclosed by a fabric. The play mat may include a first and second pocket each fixedly coupled to the fabric. The play mat may include a rod-like element that has a substantially continuous outer surface. A first end of the rod-like element may be positioned within the first pocket and a second end of the rod-like element may be positioned within the second pocket. The play mat may include a slidable member or fastener having an opening and a slot. The slot may be positioned about the rod-like element so that the fastener is slidingly engaged with the rod-like element. The opening may be sized to permit an article to be passed through the opening when coupling the article to the fastener. For example, the article may comprise a first item that is coupled to a second item by a length of material. The first item may be compressed and passed through the opening, with at least a portion of the length of material being positioned within the opening.

BRIEF DESCRIPTION OF THE DRAWINGS

Aspects of the present disclosure may be more completely understood in consideration of the following accompanying drawings.

FIG. 5 shows a second example item attached to the play gym of FIG. 1.

FIG. 6A shows a first example clip in accordance with the present disclosure.

FIG. 6B shows a second example clip in accordance with the present disclosure.

FIG. 6C shows the clip of FIG. 6B in alternate perspective.

FIGS. 9A, 9B, 9C illustrate coupling of a coupling member to a tethered member in accordance with the present disclosure.

FIG. 11 shows movement of an example clip of the play gym of FIG. 7.

FIGS. 16A, 16B, 16C show steps for coupling of an exemplary item to the play mat of FIG. 13.

FIGS. 23A and 23B schematically illustrate a method of forming a coupling that joins legs of a canopy, in accordance with an embodiment.

DETAILED DESCRIPTION

Figure 1:
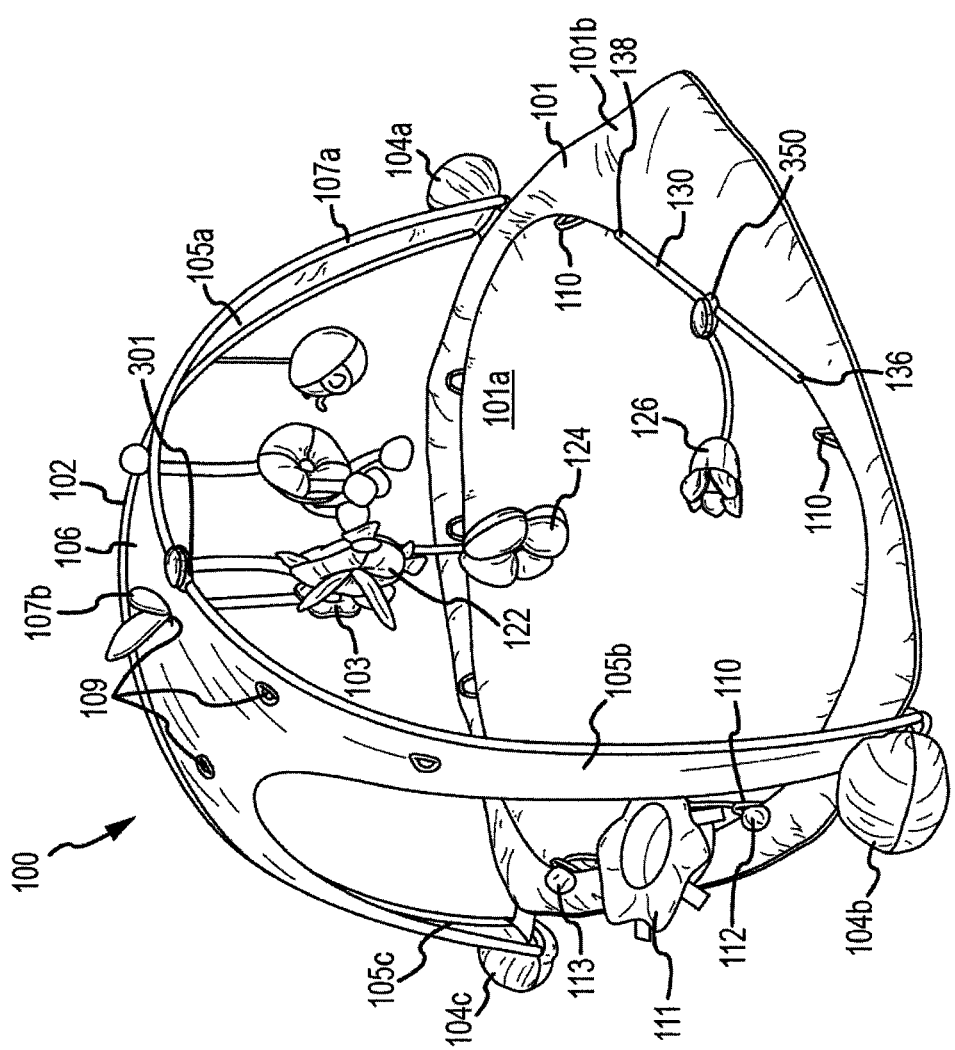
FIG. 1 shows a first example play gym in accordance with the present disclosure.

Embodiments of the present disclosure include child care equipment, such as play gyms and play mat systems, and methods of attaching toys or other items to child care equipment.

In some embodiments, the child care equipment may be configured to include a track, such as a rod or other rigid member with a continuous outer surface, and a sliding member that moves along the track. The sliding member may be configured so that one or more toys or other items may be easily and/or releasably attached thereto. Toys or other attached items may be interchanged and moved to different locations as desired. For example, the track may be suspended above a baby in a play gym, and toys hanging from the track may be moved to be within the baby's reach. A track may also be part of another kind of equipment, such as a pad or pillow or play mat, and attached toys or other items may be moved to a location where the child is lying. Other kinds of attachments may also be provided. The track may be, for example, a rod that is completely embedded within the piece of equipment, such as within a fabric sleeve, with the clip sliding over the fabric sleeve. Alternatively, the track may be coupled to the equipment such that the track remains exposed. In this way, the clip slides directly over the track. The track may form an outwardly convex shape that a slidable member can partially enclose so as to engage with the member, or the track may form a groove, within which a slidable member can engage. In either such case, the track may present a constant cross-sectional profile to the slidable member, and therefore the track may advantageously be formed by extrusion, for low manufacturing cost.

In an aspect, a child care equipment system is disclosed. The system may include a canopy formed by a plurality of rods. The rods may be semi-rigid in the sense that they may be stiff enough to remain substantially straight when unstressed, they may lightly resist bending, and they may regain substantial straightness when any bending force is removed. A canopy track, that may in some cases include a rod-like member, may be fixedly coupled to or incorporated with one or more of the plurality of semi-rigid rods. A canopy clip or other slidable member may be slidingly coupled with the canopy track. The system may also include a padded base coupled to the canopy so that the canopy arches over the base. A base track, that in some cases may include a rod-like member, may be fixedly coupled to the padded base. A base clip, or other slidable member, may be slidingly coupled with the base track. The system may further include at least one item, such as a toy or other baby entertainment device, that includes a main body and a coupling member coupled to the main body by a tether. The coupling member may be resilient and/or compressible so that the item may be coupled to the canopy clip or the pad clip by compressing the coupling member and inserting it within an opening of the canopy clip or the pad clip. In this way, the tether extends at least partially through the opening.

In one aspect, the coupling member may be a ball-like padded item enclosed by a piece of fabric that may be compressible to a size smaller than the opening. In this way, when the coupling member is compressed and passed through the opening, the coupling member and the main body are exposed on opposite sides of the opening. As another example, the coupling member may be a padded item enclosed by a piece of fabric that may be compressible to a size smaller than the opening by folding the padded item (optionally, by folding about a seam of the padded item) so that when the coupling member is folded and passed through the opening, the coupling member and the main body are exposed on opposite sides of the opening. In some cases, the coupling member may be shaped like a ball, a block, a pyramid, a button, a tree leaf, a flower, an animal, a wing, or the like.

In a further aspect, the child care equipment system may also include a first fabric covering the canopy track, and a second fabric covering each of the plurality of rods. The canopy track may be fixedly coupled to one of the rods by coupling the first fabric covering the canopy track to the second fabric that covers each of the rods. In a further aspect, components of the child care equipment system may be configured as a play gym, a play yard, a playpen, a swing, a baby bouncer, a stroller, a changing pad or a changing pad cover. In another aspect, the item may be a toy, a doll, a ball, a mirror, a block, a pyramid, a teething ring, a toy shaped like an animal or insect, a toy shaped like a plant or flower, an item that generates sound, an item that generates vibration, an item that generates light, or the like.

In one particular arrangement, the system may also include at least one pillow that has at least one flexible loop coupled thereto. The item may be coupled to the loop when the coupling member is compressed and passed through an opening of the loop so that at least a portion of the tether is positioned within the opening of the loop.

In another embodiment, a piece of child care equipment is disclosed. The equipment may include a plurality of semi-rigid rods that form a frame. The equipment may include a canopy track coupled to a particular one of the semi-rigid rods. The canopy track may be, for example, a rod that is enclosed in a fabric sleeve, or a track that presents a different mechanical feature for slidably engaging one or more features thereto. The equipment may include a slidable member, such as a ring-shaped frame member, having a passage that is slidably engaged with the track, and an opening for attaching an item to the frame member. The equipment may include a base coupled to the frame. The base may include a padding enclosed by a fabric. The base may include a base track coupled to a portion of the fabric. The base track may include mechanical features that are similar to those discussed above in connection with the canopy track. The base may include a ring-shaped base member having a passage that is engaged with the base track and an opening for attaching the item to the base pad. The base may include a plurality of resilient coupling members spaced apart and each affixed to an edge of the base via a tether. Further, a flexible loop may be positioned at an end of each of the plurality of semi-rigid rods. This loop defines an opening so that one of the coupling members may be compressed and positioned through the opening to couple the frame to the pad.

In one aspect, the semi-rigid rods may form a tripod frame, may be integrally formed together, and/or may be coupled together by a removable coupling. In another aspect, the piece of child care equipment may include a fabric that covers the canopy track, and the frame member may include a passage that is in contact with the fabric covering the canopy track. Further, the piece of child care equipment may include a fabric covering the base track, and the base may include a passage that is in contact with the fabric covering the base track.

In a further embodiment, a play gym is disclosed. The play gym may include a padded base including at least three resilient members spaced apart and each affixed to an edge of the base by a tether. The padded base may include a track, such as a base cylindrical member, fixedly coupled to a surface of the base. The padded base may include a base clip or other slidable member that is slidingly coupled with the base cylindrical member. The play gym may include a frame coupleable to the padded base and including at least three poles. The frame may include a track, such as a frame cylindrical member, fixedly coupled to a surface of one of the poles. The frame may include a frame clip, or other slidable member, slidingly coupled with the frame cylindrical member. The frame may include a resilient loop positioned at an end of each of the poles. The loop defines an opening so that the tether of one of the resilient members extends at least partially through the opening when the one of the resilient members is compressed and inserted within the opening, thereby coupling a corresponding pole to the base. In one aspect, a padded material may cover each one of the poles, and a fabric may cover the padded material. In one aspect, the base clip may include a passage that is in contact with a fabric covering the frame cylindrical member. The frame clip may include a passage that is in contact with a fabric covering the base cylindrical member. The base clip and/or the frame clip may be formed from a plastic material.

FIG. 1 shows a first example play gym 100 in accordance with the present disclosure. The play gym 100 may include at least a base pad 101 and a canopy 102. In one mode of use, the play gym 100 may be placed or positioned on a floor. The base pad 101 may include a padded center portion 101a and a padded peripheral portion 101b, the padded peripheral portion 101b may form an outer boundary. A seam may be formed between portions 101a and 101b, where fabric from each of the portions 101a and 101b is joined together. One way to construct the base pad 101 may include placing a batting, such as polyester batting, on the fabric of the base pad 101, and sewing the fabric together to form the various seams. Stitching between the center portion 101a and the peripheral portion 101b may serve to limit the amount of shifting of the fill or batting material. In one example, an infant or child may be placed on the base pad 101, and may interact with various toys or other items such as an item 103 that is suspended from the canopy 102 or attached to the base pad 101. In this manner, the play gym 100 may provide a safe, comfortable, and convenient place for the infant to spend time, and also provide stimulation for the baby. The play gym 100 may be especially useful for the care of infants who have not yet begun to crawl. Having items attached to the play gym 100 may keep the baby's toys in a contained area and within the baby's reach. Other benefits are possible as well.

The base pad 101 may be, for example, made of a soft cloth or fabric, and may be filled with padding such as foam or fiberfill padding or batting. The base pad 101 may preferably be of a size that is suitable for holding a baby. For example, the base pad 101 may be about 30 to 36 inches across, however other larger or smaller sizes may be used. Further, the base pad 101 may be of any suitable shape, including round, oval, oblong, rectangular, or another shape, such as may be observed when the base pad 101 is laid-out or fully deployed as shown in FIG. 1.

The base pad 101 may include a plurality of attachment members 104a-c each affixed to an edge portion of the base pad 101. Although three are shown more or fewer attachment members may be provided. The attachment members 104a-c may be, for example, fabric-covered foam or fiberfill material in a ball shape, or another suitable shape. While the attachment members 104a-c are preferably compressible, substantially rigid shapes could be used as well, for example plastic balls. Each of the attachment members 104a-c may be affixed to the base pad 101 by sewing a portion of a covering of a respective attachment member (e.g., attachment member 104b) into an edge seam of base pad 101, by sewing a tether to both the attachment member and base pad 101, or by any other suitable means.

The canopy 102 may be configured to arch over the base pad 101, standing on three legs 105a-c, forming an arched support frame. The canopy 102 may reach a height of, for example, 12-24 inches over the base pad 101, and may be used to hang toys or other items 103 within reach of a baby placed in or on the play gym 100. Although three legs are shown, more legs, or perhaps fewer legs, and other dimensions, could be used. The canopy 102 may comprise of a surface sheet 106, which may be, for example, a fabric or plastic sheet, and may be of a single thickness, or comprise multiple thicknesses of one or more materials. The surface sheet 106 may be made of multiple pieces integrated together, and the pieces need not be of the same materials. The canopy 102 may also include at least two semi-rigid rods 107a and 107b that may be embedded within the canopy 102. The semi-rigid rods 107a and 107b may be made of, for example, plastic, metal, fiberglass, graphite, or composite material, and may be round or another shape in cross-section. The semi-rigid rods 107a and 107b may preferably be stiff enough to remain substantially straight when unstressed, to lightly resist bending, and to regain substantial straightness when any bending force is removed. In one example embodiment, the rods 107a and 107b are each about 28 inches long and about ¼ inch in diameter, and are made of unreinforced plastic. Other sizes may be used. Further, in some cases, the rods may include a reinforcement, such as a wire that is coated with a plastic cover, similar to an electrical wire. In some cases, the rod may be constructed of a metal wire and not include any coating.

First ends of both the rods 107a and 107b follow a first leg 105a of canopy 102 to its connection with base pad 101. The rods 107a and 107b may be embedded within edges of the surface sheet 106, but other placements may be used. A second end of the first rod 107a follows a second leg 105b to its connection with the base pad 101, and a second end of the second rod 107b follows a third leg 105c to its connection with base pad 101. The rods 107a and 107b thus support canopy 102 by virtue of their stiffness, similar to the way a tent may be supported by tent poles.

As described in greater detail below with reference to at least FIG. 5, FIG. 8 and FIG. 11, a clip 301 may be slidingly engaged with rod 107a. The clip 301 may slide anywhere along rod 107a to adjust the position of one or more toys that are coupled to clip 301. This may provide a convenient way for an individual to adjust the location of a toy relative to a child. For example, when removing a child from the base pad 101, when changing a diaper or cleaning the baby, the individual may slide the clip 301 along the rod 107a to afford better access into the interior of the tent. To keep the child entertained, the clip 301 may be slid such that the toy hangs over the arched support. Although shown attached to the rod 107a, it will be appreciated that the clip 301 may be coupled to any of the rods. Moreover, multiple clips could be attached to a single rod. Also, multiple toys may be chained together, such as toys 122 and 124 of FIG. 1, to increase the length of the toy and provide a different arrangement for the toys that are suspended from the base pad 101.

Figure 3:
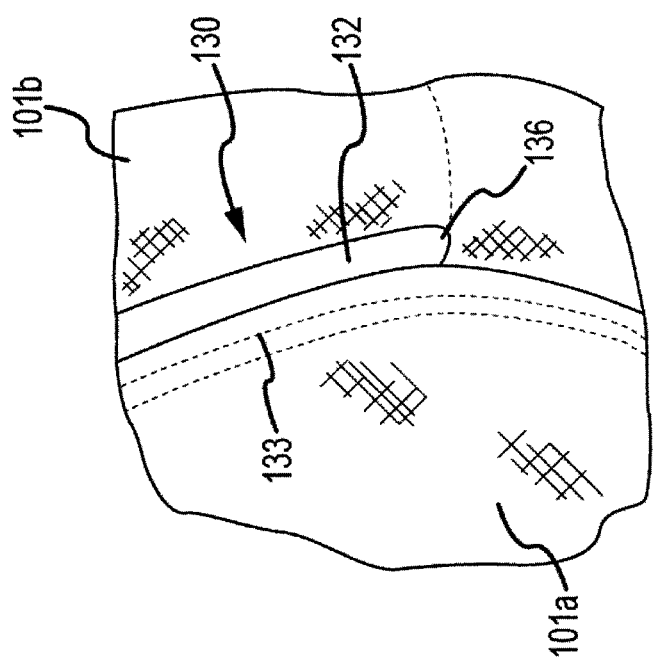
FIG. 3 shows a magnified view of one end of a track of the play gym of FIG. 1.

The base pad 101 may also include one or more tracks 130 that may be coupled anywhere along a top or side of the base pad 101. It will be appreciated that tracks 130 are options and may not be included in certain embodiments. In one embodiment, the track 130 is a semi-rigid or flexible rod that may function similar to the rod 107a in supporting one or more clips 350 as described in greater detail below with reference to at least FIGS. 6, 17, 19, 21 and 22. Further, as illustrated in FIG. 3, the track 130 may comprise of a semi-rigid or flexible rod that is coupled to the base pad 101 by a fabric sleeve 132. More specifically, the sleeve 132 may comprise a fabric strip that has its lengthwise ends sewn into a seam 133 in the base pad 101 to form a tube. The seam 133 is the seam that is formed upon connecting the portions 101a and 101b. The rod 107b may be slid through sleeve 132, or inserted into the sleeve 132, and then ends 136 and 138 of the sleeve 132 may be sewn down and incorporated into the seam. Prior to sewing the ends 136 and 138 into the seam 133, a clip 350 may be inserted over the fabric sleeve 132. In this way, the clip 350 will not detach from the track 130. As another option, the ends of the rod 107a may be held in pockets to secure the rod 107a to the base pad 101. In this way, a fabric sleeve may be omitted. It will be appreciated that other types of tracks and slidable members could also be used as long as the slidable member can easily slide along the track and be firmly held in place at any one of multiple desired positions.

One or more toys 126 may be coupled to the clip 350 in a manner similar to that described in connection with other embodiments. This allows items, such as toys to be removably coupled with the base pad 101. Further, the location of the items can easily be adjusted by sliding them along the track 130 using the clip 350. For example, a toy can be moved to a mid-portion of base pad 101 to provide easy access to the toy by the child. However, when the child needs to be removed from the base pad 101, the clip 350 may be slid to one side to move the toy. As another example, the clip 350 may be slid along the track 130 to place the toy in a different location to provide a different environment within the play structure.

The fabric used to form fabric sleeve 132 may be durable because of friction caused by the slider clip when moving over the rod. The fabric may durable enough so that the rod will not break through the fabric over time. Preferable fabrics include nylon fabrics such as, for example, a denier nylon with or without a polyurethane coating.

Figure 2:
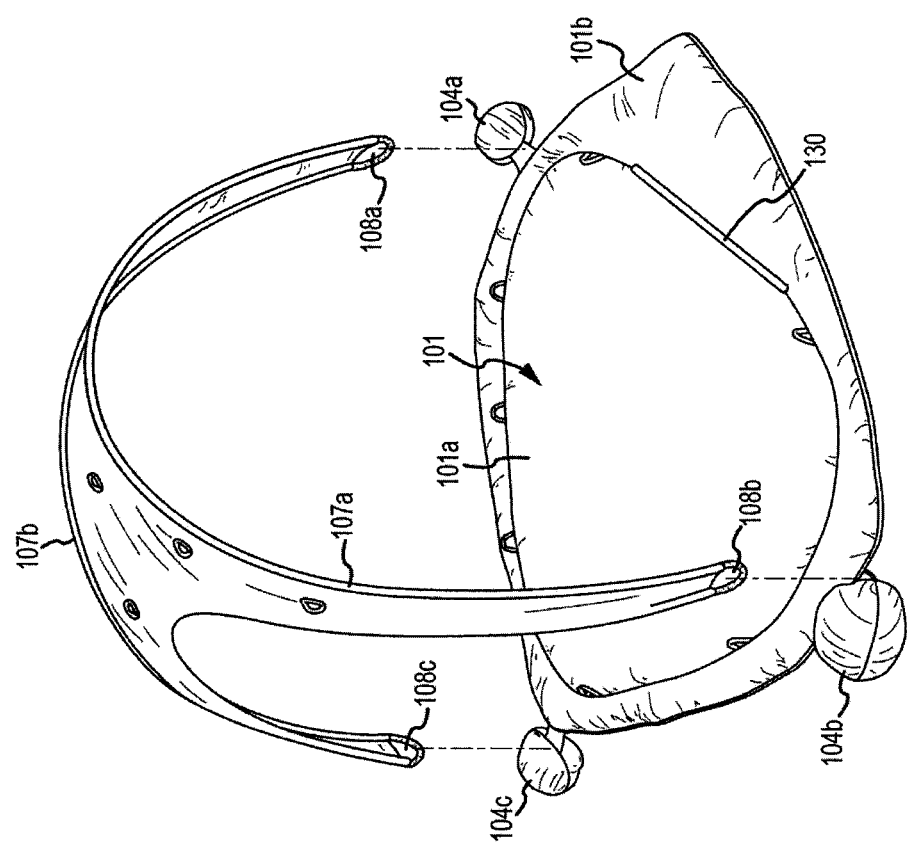
FIG. 2 shows the play gym of FIG. 1 with some of its parts separated.

FIG. 2 shows the play gym 100 of FIG. 1 with some of its parts separated. In particular, FIG. 2 shows the canopy 102 separated from the rest of play gym 100. In this example, canopy attachment loops 108a-c are placed at the lower ends of the legs 105a-c. The loops 108a-c may be configured to engage the attachment members 104a-c to attach the canopy 102 to the base pad 101. To make the attachment, each attachment member may be passed through its respective loop. When the attachment members 104a-c are compressible, each attachment member may be compressed to pass through its corresponding loop and then allowed to re-expand. For example, attachment members 104a-c may be compressed such that their volume is reduced by at least about 50% or more to facilitate their placement through the attachment loops. When released, the attachment members 104a-c spring back to their original shape and volume. The canopy attachment loops 108a-c may also be stretchable, so that when the loops are unstretched, the loops are smaller than the attachment members. This arrangement may help ensure a secure attachment of the canopy 102 to the base pad 101, but also allow for easy disassembly of play gym 100. As another option, the loops 108a-c may each be constructed of two straps with ends having a hook and loop fastener material. In this way, the two straps may be wrapped about the attachment members 104a-c and then secured to each other about their respective ends. In some cases, other attachment schemes may be used to couple the ends to the base pad, with the attachment members serving as ornamentation.

The play gym 100 may include one or more openings for attaching items 103 to the play gym 100. For example, the surface sheet 106 may include spaced apart holes 109, which may be reinforced by stitching around the perimeter of the hole or by other means. In another example, the base pad 101 or the canopy 102 may include loops such as item attachment loops 110 shown in FIG. 1. These holes and loops may be used to attach various toys. However, the holes and loops may also be used with traditional toy links, also referred to as "C" clips or "C" links, to which various items may be attached.

Figure 4:
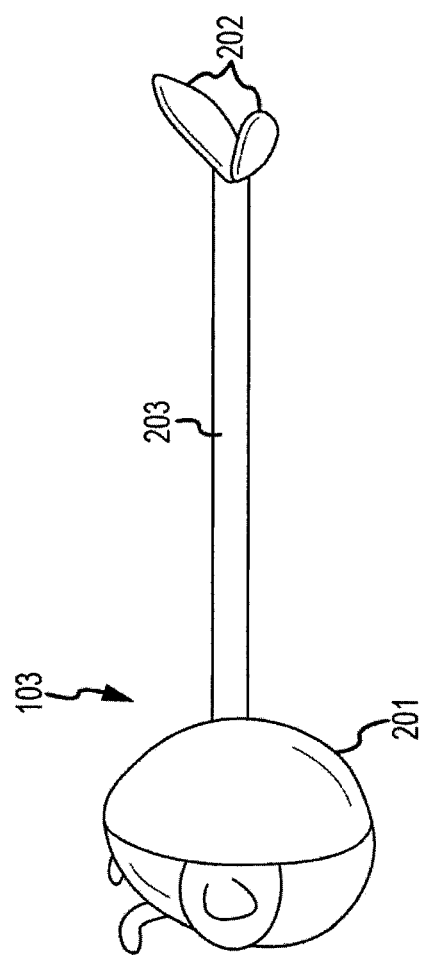
FIG. 4 shows a first example item that may be attached to the play gym of FIG. 1.

FIG. 4 shows an example item 103 that may be attached to play gym 100 of FIG. 1. In this example, item 103 is a ball configured to attach to play gym 100, but many different kinds of items may be configured to attach to the play gym 100, including such items as a toy, a block, a pyramid or other geometric shape, a doll, a teething ring, an item comprising a mirror, a toy shaped like an animal or insect, a toy shaped like a plant or flower, or another suitable item. Preferably, items attached to the play gym 100 are selected to be entertaining and stimulating to an infant placed in the play gym 100.

As is shown in FIG. 4, item 103 includes a main body 201 and a compressible member 202 connected to the main body 201 by a tether 203. Other connection arrangements may be used. The compressible member 202 may have any suitable shape, such as a ball shape, a block shape, a pyramid shape or other geometric shape, a button shape, a leaf or flower shape, an animal shape, a shape reminiscent of wings, or another shape. The shapes may or may not incorporate sound, light or vibration features. The compressible member 202 is preferably somewhat larger in its uncompressed state than holes 109 or item attachment loops 110 so that the item 103 may be attached to the play gym 100 by squeezing or folding the compressible member 202 through one of holes 109 or item attachment loops 110 and allowing the compressible member 202 to re-expand or unfold, providing a secure but easily removable connection. This attachment system has the additional advantage that the materials involved may be soft and pliable and all of the parts may be relatively large, resulting in a safe environment for the infant.

FIG. 5 shows a first example item 302 attached to the play gym 100 of FIG. 1. In particular, FIG. 5 illustrates another embodiment of an attachment of an item 302 to the play gym 100. Here, the clip 301 is slidingly engaged with the rod 107a. One or more clips such as the clip 301 may be engaged with any or all rods of canopy 102. In one embodiment, the rod 107a is embedded in the play gym 100 so that it is accessible for engagement with the clip 301. For example, the rod 107a may be embedded by wrapping rod 107a in a portion of the surface sheet 106. In that configuration, the rod 107a may be thought of as residing in a tubular pocket sewn into surface sheet 106. Not all of the rod need be wrapped or embedded. Even if part of a rod is wrapped, some of the rod may be left exposed. In some embodiments, the portion of surface sheet 106 wrapping rod 107a may be made of a woven nylon or other durable fabric, to provide a suitable amount of friction to clip 301, and to resist wear.

FIG. 6A illustrates the clip 301 in isolation. The clip 301 is generally toroidal, and need not be perfectly toroidal. A slotted passage 303 is provided at one side of clip 301. The slotted passage 303 may be configured to slidingly engage the rod 107a. The rod and slotted passage may be any size, so long as the passage 303 is sized so that the clip 301 is easily slid along the rod, but will maintain its position on the rod when left at rest. This kind of sliding fit may be facilitated by the natural compliance of a portion of the surface sheet 106 that may be wrapped around the rod, and by the split configuration of the passage 303. That is, a surface of the slotted passage 303 is in contact with the surface sheet 106. The clip 301 may be substantially rigid so that it is not reasonably removable from the rod without sliding clip 301 past an end of the rod.

Once the clip 301 is engaged with the rod 107a the fabric or other material wrapping rod 107a may engage with a slot 304 of the passage 303, and limit the rotation of the clip 301 around the rod 107a. A hole 305 formed by the clip 301 may provide an opening configured for attaching items to the play gym 100. For example, the compressible member 306 of item 302 may be passed through the hole 305 to hang the item 302 from the canopy 102. Multiple clips 301 may be provided on the play gym 100, and one or more clips may be provided on any or all semi-rigid rods used to support a canopy. Any or all clips 301 mounted on the canopy 102 may be easily moved to adjust the positions of items such as item 302 attached to the canopy 102 using clips 301.

It will be appreciated that many variations are possible in the configurations of the items to be attached to a piece of child care equipment such as play gym 100. For example, referring again to FIG. 1, item 111 may comprise a mirror surface (which may be surrounded by suitable padding) to allow the child to see a reflection of himself or herself. Item 111 may also comprise two compressible members 112 and 113, which as shown in FIG. 1 are passed through two of item attachment loops 110, to constrain the position of item 111. In contrast, item 302 as shown in FIG. 5 may exhibit a main body in the shape of an animal. Other items may have main bodies shaped like insects, plants, flowers, geometric shapes, or other objects that may entertain or stimulate the child.

In some embodiments, an item attached to a piece of child care equipment may generate sound. For example, a ball or other item may be filled with a material that makes a crackling sound when the ball is squeezed, encouraging the child to interact with the item. An attached item could include an electronic sound generating device that plays music, animal sounds, tells a story, or generates some other kind of sound when the item is squeezed, caused to move, or otherwise activated. In addition, an item may also incorporate a light feature and/or a vibration feature which can be activated by movement or a switch, also encouraging the child to interact with the item. An example of a light feature may include a small, steady or flashing light emitting diode ("LED") integrated with a battery for power and an on/off switch, or a motion sensor and circuitry that powers off the LED after a period during which motion is not sensed. An example of a vibration feature may include a small motor or other transducer that generates a steady or intermittent vibration, similarly integrated with a battery for power and an on/off switch, or a motion sensor and circuitry that powers off the transducer after a period during which motion is not sensed.

FIGS. 6B and 6C illustrate an embodiment of the clip 350, FIG. 1, in greater detail. The clip 350 may comprise of a clip body 352 that is generally toroidal in geometry. Here, the clip body 352 has a slot 354 leading to a passage 356 through which a rod, such as rod 107b, will slide. The slot 354 may be wide enough to allow a fabric sleeve (such as fabric sleeve 132, FIG. 3) to slide through it, and the passage 356 may be sized to be just large enough so that it may smoothly slide over the rod and fabric sleeve, such that the clip 350 may be moved easily (e.g., by an infant or baby) along the track 130. When the passage 356 is too large, the clip 350 may be too loose and may not easily slide, and may be able to separate from the rod. Conversely, if the clip 350 is too small, then the clip 350 may bind against the sleeve and/or rod making movement difficult. Thus, the rod should be small enough that it can be wrapped in the nylon fabric forming the sleeve and still have the clip slide, but not so small that the clip snaps off the rod and presents a safety hazard. The passage in the clip 301 may be sized in a similar manner. The clip 350 may also define a central opening 358 where a compressible member of a toy may be place similar to other embodiments described herein.

Another feature of the clip 350 is that the slot 354 is generally perpendicular to the clip body, while with the clip 301 the slot 304 is parallel to the clip body. This may permit the clip 350 to be generally parallel to the base pad 101 as illustrated in FIG. 1 so that it does not stick up and interfere with the baby's play. With the clip 301, the clip body is generally aligned with the fabric on the arched support. While the clip body does extend from the rod, this does not interfere with the baby's play, and also allows the toy to more easily hang from the arched support. In some cases, clips may be constructed where the slot is at different angles relative to the clip body, such as 15 degrees, 30 degrees, 45 degrees, 60 degrees and the like, to permit the clip body to be at different angles relative to the adjacent fabric or base layer.

Many variations are also possible in the shapes of the compressible members used to attach items to the child care equipment. For example, compressible member 202 shown in FIG. 4 may be reminiscent of leaves, animal ears, or wings, whereas the compressible member 306 shown in FIG. 5 is in the shape of a ball. Other possible shapes include a flattened ball or button shape, other geometric shapes, leaf and flower shapes or animal shapes.

Figure 7:
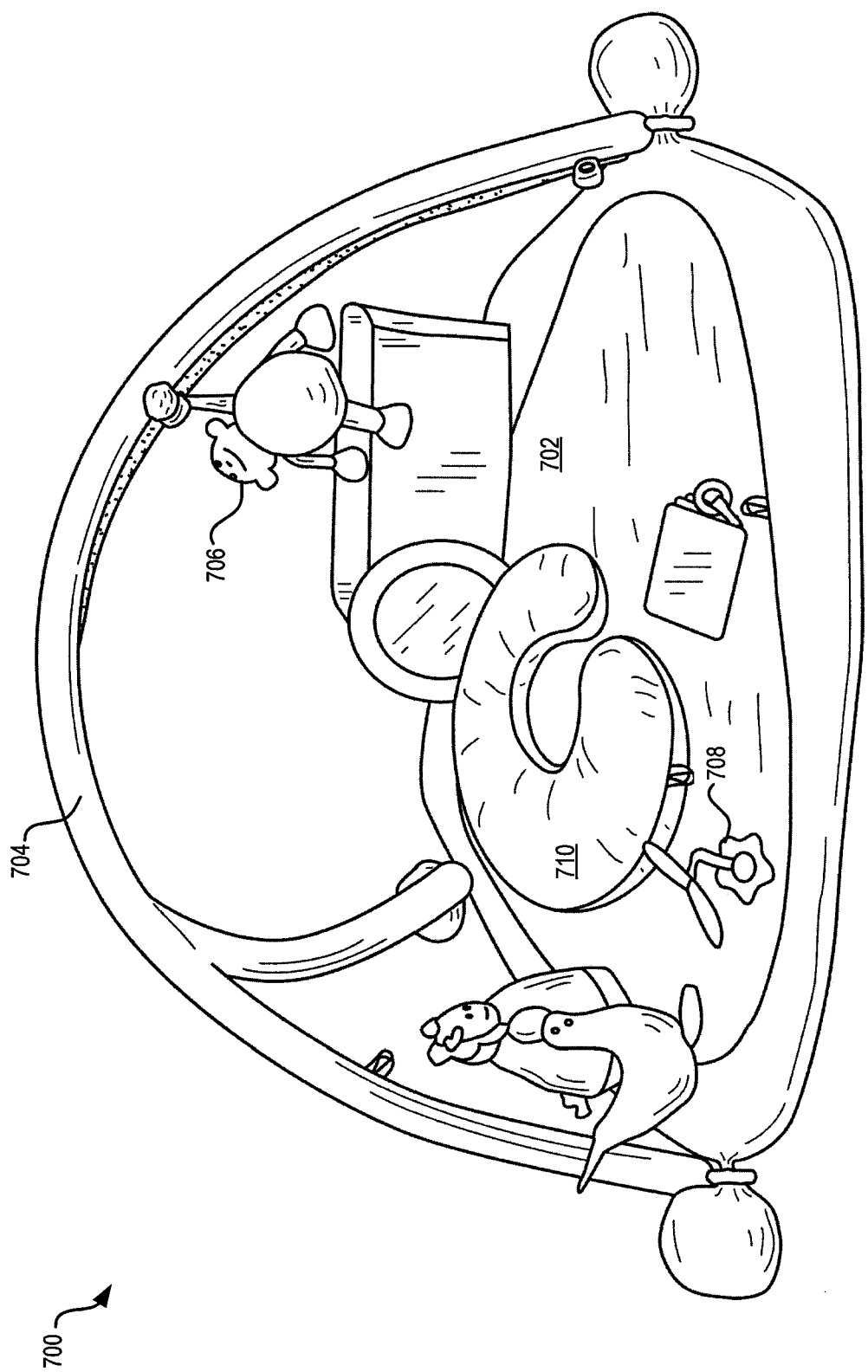
FIG. 7 shows a second example play gym in accordance with the present disclosure.

Referring now to FIG. 7, a second example play gym 700 is shown in accordance with the present disclosure. In many aspects, the play gym 700 may be similar to the play gym 100 discussed above in connection with at least FIG. 1. For example, the play gym 700 may include at least a base pad 702 and a canopy 704. In one example, an infant or baby may be placed on the base pad 702, and may interact with additional toys or other items such as an item 706 that may be suspended from the canopy 704, an item 708 that may be coupleable to the base pad 702, and an item 710 that may generally be used within the context of the environment of the play gym 700, shown as a pillow in FIG. 7. In this manner, the play gym 700 may provide a safe, comfortable, and convenient place for an infant or baby to spend time, and also provide stimulation for the infant or baby. The play gym 700 may be especially useful for the care of infants who have not yet begun to crawl, or are learning sit without assistance. Having items attached to the play gym 700 may keep the baby's toys in a contained area, and within the baby's reach. Other benefits are possible as well. For example, the play gym 700 may encourage beneficial activity or activities such as stretching, sitting, reaching, and others to promote physical and psychological development of a child.

Figure 8:
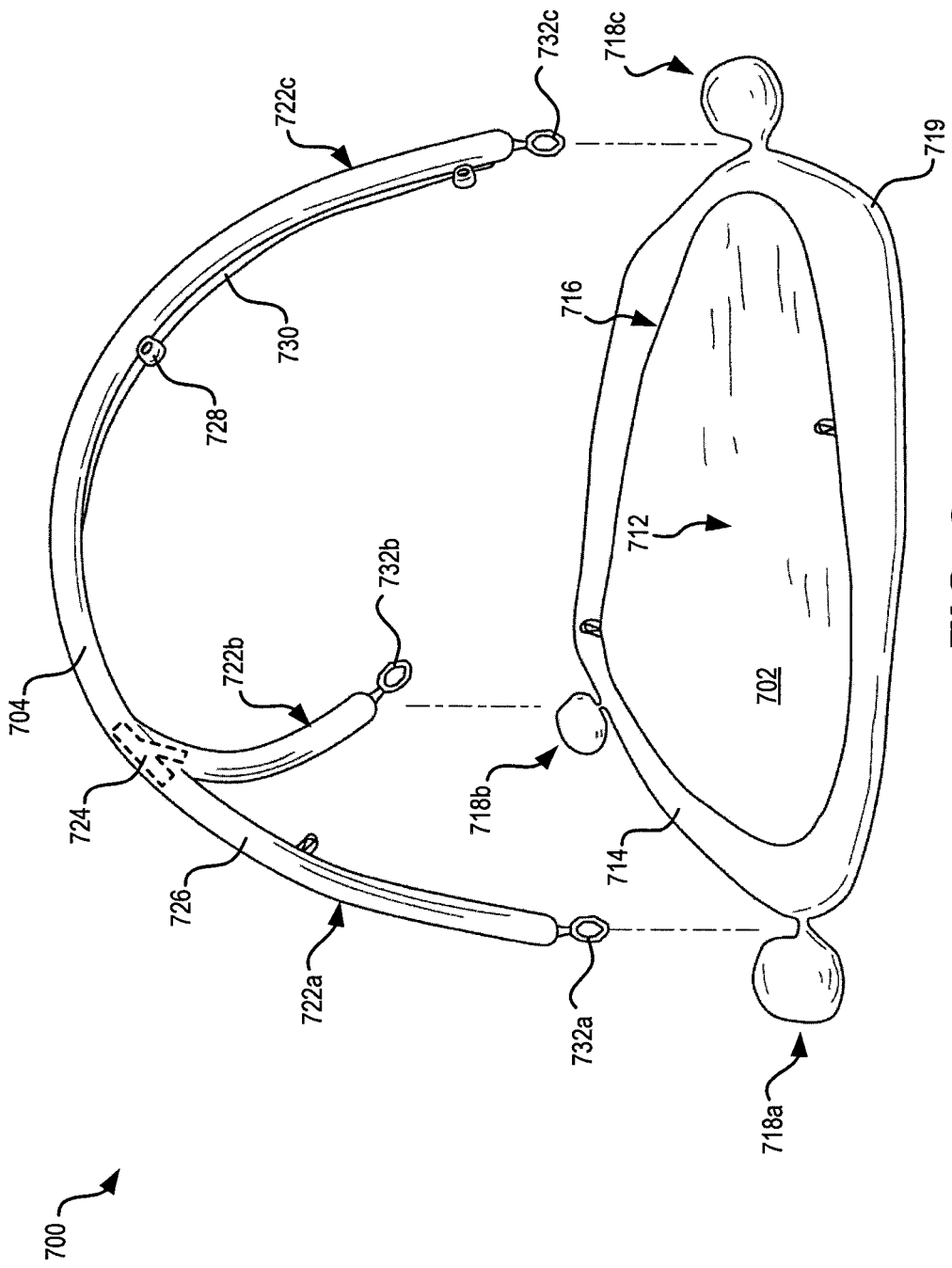
FIG. 8 shows the play gym of FIG. 7 with some of its parts separated.

Referring now additionally to FIG. 8, the play gym 700 of FIG. 7 is shown with some of its parts separated. The base pad 702 may include a padded center portion 712 and a padded peripheral portion 714. A seam 716 may form a boundary between the padded center portion 712 and the padded peripheral portion 714, where fabric from each of these portions may be joined together. The base pad 702 may be formed by placing a batting such as, for example, fiberfill padding or polyester batting on a soft cloth or fabric (not shown in FIG. 8; see FIG. 15) of base pad 702, and sewing the fabric together to form various seams, including at least seam 716. Thus, seam 716 may limit an amount of shifting of the fill or batting material within base pad 702. With respect to aesthetics, fabric of center portion 712 may generally have or exhibit particular coloring, patterning, and/or print, whereas fabric of peripheral portion 714 may generally have or exhibit a particular coloring, patterning, and/or print that is the same, similar, or at least partially different than that of the center portion 712. In this manner, the base pad 702 may be constructed so as to exhibit any desired combination of coloring, patterning, and/or print, to appeal to different consumers or consumer groups who may have different tastes in regards to aesthetically pleasing qualities or attributes of the play gym 700.

The base pad 702 may be of a size that is suitable for holding a baby. For example, the base pad 702 may be about 41 inches by about 40 inches, to provide plenty of room for an infant or baby to stretch, scoot, roll, and etc However, it is contemplated that other larger or smaller sizes may be used. Further, the base pad 702 may be of any suitable shape, including round, oval, oblong, rectangular, or another shape, such as may be observed when the base pad 702 is laid-out or fully deployed as shown in FIG. 8.

The base pad 702 may include a plurality of coupling members 718a-c, each affixed to an edge portion 720 of the base pad 702. Although three are shown, more or fewer coupling members 718 may be provided. One or more of the coupling members 718a-c may be, for example, fabric-covered foam or fiberfill material within fabric of base pad 702, forming a local ball shape, or another shape as desired. While the coupling members 718a-c may be compressible, substantially rigid shapes could be used as well. For example plastic balls may be disposed within fabric of the coupling members 718a-c. In one embodiment, each one or more of the coupling members 718a-c, such as the coupling member 718a, may be formed by sewing a portion of a covering of a respective coupling member into an edge seam 719 of the base pad 702, by sewing a tether (e.g., like any of tether 750, FIGS. 10A-10C, tethers 1284 and 1292, FIG. 12, or tether 1634, FIGS. 16A-10C) to both the coupling member 718a and the base pad 702 for example, or by any other suitable means. An example of coupling the base pad 702 to the canopy 704 using one of coupling members 718a-c is discussed in detail below in connection with at least FIGS. 9A-9C.

The canopy 704 may be configured to arch over the base pad 702, standing on three legs 722a-c, forming an arched support frame. The canopy 704 may extend to a height of, for example, 12-24 inches over the base pad 702, and may be used to hang toys or other items within reach of a baby placed in or on the play gym 700. Although the example canopy 704 is shown to include three legs, more legs, or perhaps fewer legs, and other dimensions, could be used. Further, each of the legs 722a-c may be formed at least partially of a semi-rigid wire or rod that may be made of, for example, plastic, metal, or a composite material, and may be round or another shape in cross-section. Each of the legs 722a-c may also include sheathing such as foam and/or fabric that envelops the wire or rod. The semi-rigid wires or rods may preferably be stiff enough to remain substantially straight when unstressed, to lightly resist bending, and to regain substantial straightness when applied bending force is removed. In one example embodiment, the rods are each about 28 inches long and about ¼ inch in diameter, and are made of unreinforced plastic. Other sizes may be used. A lower end of each of legs 722a-c may be coupled with a respective loop or ring 732a-c, that in turn may be coupled with a corresponding one of the coupling members 718a-c, as discussed further below.

In one embodiment, the legs 722a-c may be formed as an integral structure. In this example, the canopy 704 may correspond to a unitary element so that canopy 704 may not be disassembled to separate the legs 722a-c from one another. A molding or extrusion type process, for example, may be used to form such a structure. In another embodiment, canopy 704 may correspond to a multi-piece element so that the canopy 704 may be disassembled to separate or disconnect at least one of legs 722a-c from one another. Here, a coupling 724, illustrated as coupling 724a in broken lines within the canopy 704 in FIG. 8, may take the form of a "T"-shaped coupling. For example, in an embodiment, where an external thread of the leg 722a may be mated to a first internal thread of the coupling 724a, an external thread of the leg 722b may be mated to a second internal thread of the coupling 724a, and an external thread of the leg 722c may be mated to a third internal thread of the coupling 724a to assemble the canopy 704. It is contemplated that the canopy 704 may be disassembled by a reverse process. Such an implementation may be beneficial, for example, when it is desired to deconstruct and store the play gym 700. In another embodiment, a coupling or other attachment scheme may permanently or removably join any of legs 722a-c with one another, as shown in FIGS. 23A and 23B, discussed further below.

Other embodiments are possible. For example, respective ones of the legs 722a-c may be coupled to the coupling 724a by an interference or snap-together fit, where an appropriate end of each one of legs 722a-c may be "pushed" or "snapped" into a particular receiving aperture of the coupling 724a. Similar to the above-mentioned thread-like coupling mechanism, such an implementation may be beneficial when it is desired to deconstruct and store the play gym 700. Still other embodiments and/or benefits are possible as well.

In general, the legs 722a-c of the canopy 704 may be formed of a plastic, a metal, a composite, etc. In some embodiments, the legs 722a-c may covered by a soft cloth or fabric that may exhibit any particular print or pattern as desired. This may serve to protect an infant or other individual from direct contact or interaction with legs 722a-c. For example, a sleeve 726 of soft cloth or fabric may be fitted over each of the legs 722a-c. The sleeve 726 may or may not be sewn along one or more seams. In some embodiments, the legs 722a-c may also be covered by a padding material such as foam, for example, to further protect an infant or other individual from direct contact or interaction with the legs 722a-c. In this example, the padding material may be formed as a sleeve or tube that has a slit so that the padding material may be fitted to the legs 722a-c, and then the sleeve 726 may by fitted over the padding material. Other embodiments are possible.

As described in greater detail below with reference to at least FIGS. 10-11, a clip 728 may be slidingly engaged with a rod 730 that is rigidly affixed or coupled to a particular one of the legs 722a-c. Although a single rod is shown in FIGS. 10-11, the play gym 700 may exhibit at least one other rod that may be rigidly affixed or coupled to another particular one of the legs 722a-c. The clip 728 may slide along the rod 730 to adjust the position of one or more items such as toys that may be coupled to the clip 728. This may provide a convenient way for an individual to adjust the location of a toy relative to a child. For example, when a child is lying down on the base pad 702 for a diaper change, the individual may slide the clip 728 along the rod 730 so that the toy is closer to ground level, so that the child or infant may reach the toy. In another example, the individual may slide the clip 728 along the rod 730 so that the toy is further from ground level, for example towards an apex of the canopy 704, when the child is sitting on the base pad 702, so as to encourage the child to "reach" to promote development of motor skills and/or muscle mass. Although described as a clip, it will be appreciated that a variety of slidable members may be used with any of the tracks described herein. The slidable members are slidably coupled to the track in any mechanical manner such that they may slide along the track. Also, the slidable members may be configured to permit an item to easily be coupled to the slidable member. This may be accomplished, for example, by including a slot or opening in the slidable member, or using other attachment mechanisms, such as snaps, ties, a hook and loop fastener material, and the like.

FIGS. 9A-9C illustrate coupling of a flexible ring 732 to a tethered coupling member 718. In particular, FIG. 9A shows the ring 732 (e.g., any one of rings 732a-c, FIG. 8) proximate the coupling member 718 (e.g., any one of coupling members 718a-c, FIG. 8). In this example, the coupling member 718 attaches to a peripheral portion 714 (e.g., the peripheral portion 714 of the base pad 702, FIG. 8) via a tether 734, while the ring 732 attaches to an end of a leg 722 (e.g., one of legs 722a-c, FIG. 8). Further, the coupling member 718 is compressible such that an individual may compress the coupling member 718 and push the coupling member 718 through the ring 732. For example, FIG. 9B shows the coupling member 718 partially pushed through the ring 732, and FIG. 9C shows the coupling member 718 completely pushed through the ring 732. In the condition shown in FIG. 9C, the tether 734 is disposed within an opening formed by the ring 732 so that the peripheral portion 714 and the coupling member 718 are disposed on opposite sides of the ring 732. The manner in which the peripheral portion 714 and the coupling member 718 are coupled to the ring 732 may make it difficult for a baby or infant to decouple the same from the ring 732. However, an adult or older child, for example, could reverse the steps shown in FIGS. 9A-9C to disconnect the ring 732 from the peripheral portion 714 and the coupling member 718.

Sizing of coupling member 718 can also affect the degree to which coupling member 718 and ring 732 may or may not be operable by an infant or baby. For example, making coupling member 718 larger than a typical infant or baby hand size (e.g., around 3 inches in diameter or larger) decreases the chance that a curious or otherwise motivated baby may be able to squeeze coupling member 718 hard enough to compress it and allow its decoupling from ring 732.

Advantageously, the coupling illustrated in FIGS. 9A-C may be similar to other connections that may be made in accordance with the present disclosure. For example, a similar connection may be formed by the use of "baby friendly" items that do not present sharp edges or swallowable objects. That is, the present coupling system has the additional advantage that the materials involved may be soft and pliable and all of the parts may be relatively large, resulting in a safe environment for the infant. Also, when ring 732 is made of resilient material, it is possible (and may be necessary) to utilize two hands to couple or decouple ring 732 with coupling member 718, In this case, one hand may stretch ring 732 while the other hand compresses coupling member 718 and pushes it through ring 732. Because two-handed cooperation is typically not within a skill set of an infant or baby, the two-handed mode of coupling or decoupling adds a further layer of "baby-proofing" to the assembly and/or disassembly of embodiments herein.

Figure 10C:
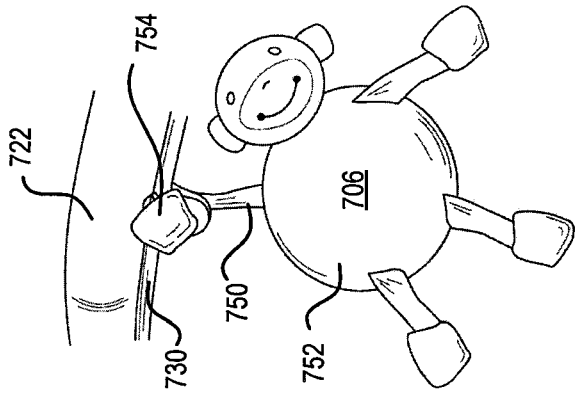
FIGS. 10A, 10B, 10C illustrate an example item being attached to the play gym of FIG. 7.
Figure 10B:
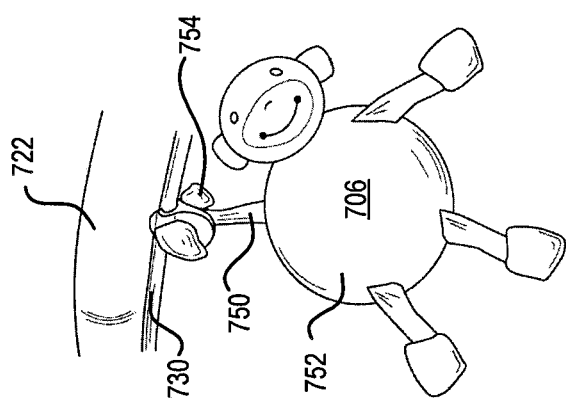
Figure 10A:
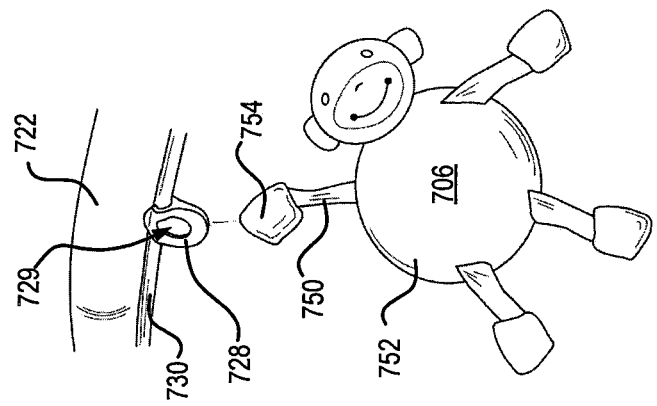

For example, FIGS. 10A-10C illustrate an example item 706 being attached to the play gym 700 of FIG. 7. In this example, the item 706 is toy-shaped like an animal that comprises at least one tether 750 between a main body 752 and a coupling member 754. The example tether 750 is made to look like a limb (arm or leg) and the coupling member 754 is made to look like a hand of the animal; in this case, clearly any of the other limbs could also act as tethers and coupling members could also represent other hands or feet of the toy. FIG. 10A shows the item 706 with the coupling member 754 proximate the clip 728. The clip 728 is slidingly engaged with the rod 730 (see e.g., FIG. 7). Attachment of the item 706 to the clip 728 may be perfected in a manner similar to connection of the coupling member 718a to the ring 732 as discussed above in connection with FIGS. 9A-9C. For example, FIG. 10A shows the clip 728 proximate the coupling member 754. In this example, the coupling member 754 attaches to a main body 752 via a tether 750, while the clip 728 attaches to the rod 730. Further, the coupling member 754 is compressible such that an individual may compress the coupling member 754 and push the coupling member 754 through the clip 728. For example, FIG. 10B shows the coupling member 754 partially pushed through the clip 728, and FIG. 10C shows the coupling member 754 completely pushed through the clip 728. In the condition shown in FIG. 10C, the tether 750 is disposed within an opening of the clip 728 so that the main body 752 and the coupling member 754 are disposed on opposite sides of the clip 728.

FIG. 11 shows movement of an exemplary clip 728 of play gym 700, FIG. 7. Clip 728 is slidingly engaged with rod 730 such that a user 770 can easily move clip 728 along rod 730, for example in the direction of arrow 760.

Figure 12:
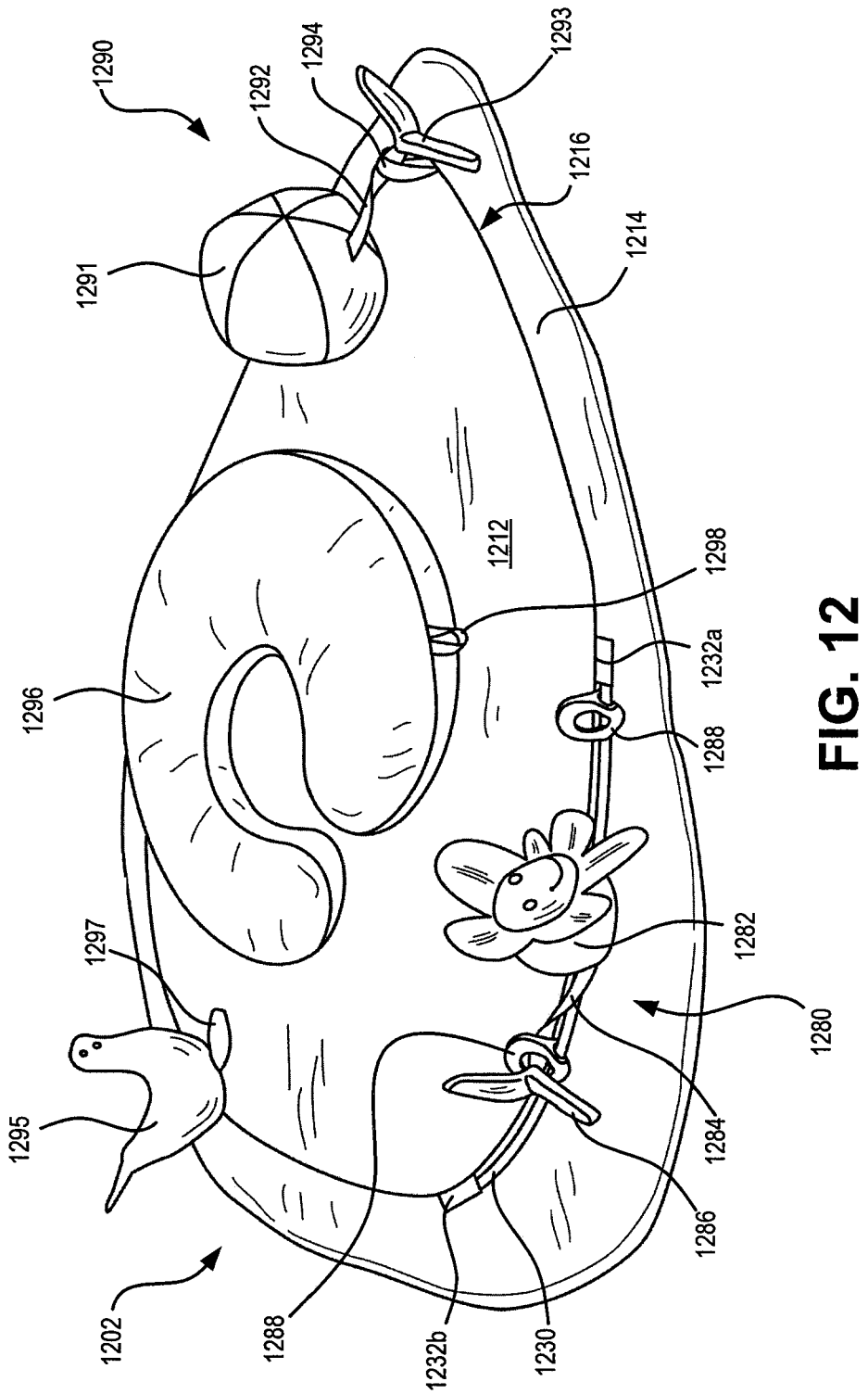
FIG. 12 shows a variety of items coupled with a play mat portion of the play gym of FIG. 7.

FIG. 12 shows a variety of items coupled or associated with a base pad 1202 that is similar to the base pad 702 of play gym 700, FIG. 7. Base pad 1202 may include a padded center portion 1212 and a padded peripheral portion 1214; a seam 1216 may form a boundary therebetween. A flower shaped toy 1280 is shown, coupled with the base pad 1202 in the same manner as item 706 couples with the leg 722 in FIGS. 10A-10C. That is, the toy 1280 includes a main body 1282, a tether 1284 and a coupling member 1286 that couple with a clip 1288 of the base pad 1202. A ball shaped toy 1290 is also shown; the toy 1290 includes a main body 1291, a tether 1292 and a coupling member 1293 that couple with a fabric loop 1294 of the base pad 1202. It should be noted that the fabric loop 1294 serves the same attachment function as the clip 1288 in terms of coupling the toy 1290 to the base pad 1202, but differs in that the fabric loop 1294 is fixedly stitched to the base pad 1202 instead of slidingly engaged to a rod, like the clip 1288. Coupling members 1286 and 1293 are each shown in FIG. 12 as resembling a pair of "leaves" with a seam therebetween; coupling and decoupling their associated toys 1280 and 1290 involves compressing the "leaves" together along the seam, similar to the method discussed further below in connection with FIGS. 16A-16C.

FIG. 12 also shows a toy 1295 and a pillow 1296. Toy 1295 and the pillow 1296 also include flexible loops 1297 and 1298 respectively, which can facilitate attachment to the base pad 1202 (or the canopy 1204, or other items) if suitably sized and tethered coupling members are provided.

FIG. 12 also shows the clip 1288 sliding along a rod 1230 that terminates in end pockets 1232a-b. As shown and discussed below in connection with FIG. 14, the end pockets 1232a-b secure ends of the rod 1230 such that when the clip 1288 abuts either of the end pockets 1232a-b the clip 1288 is blocked from further movement along the rod 1230 and does not disengage from the rod 1230.

Figure 13:
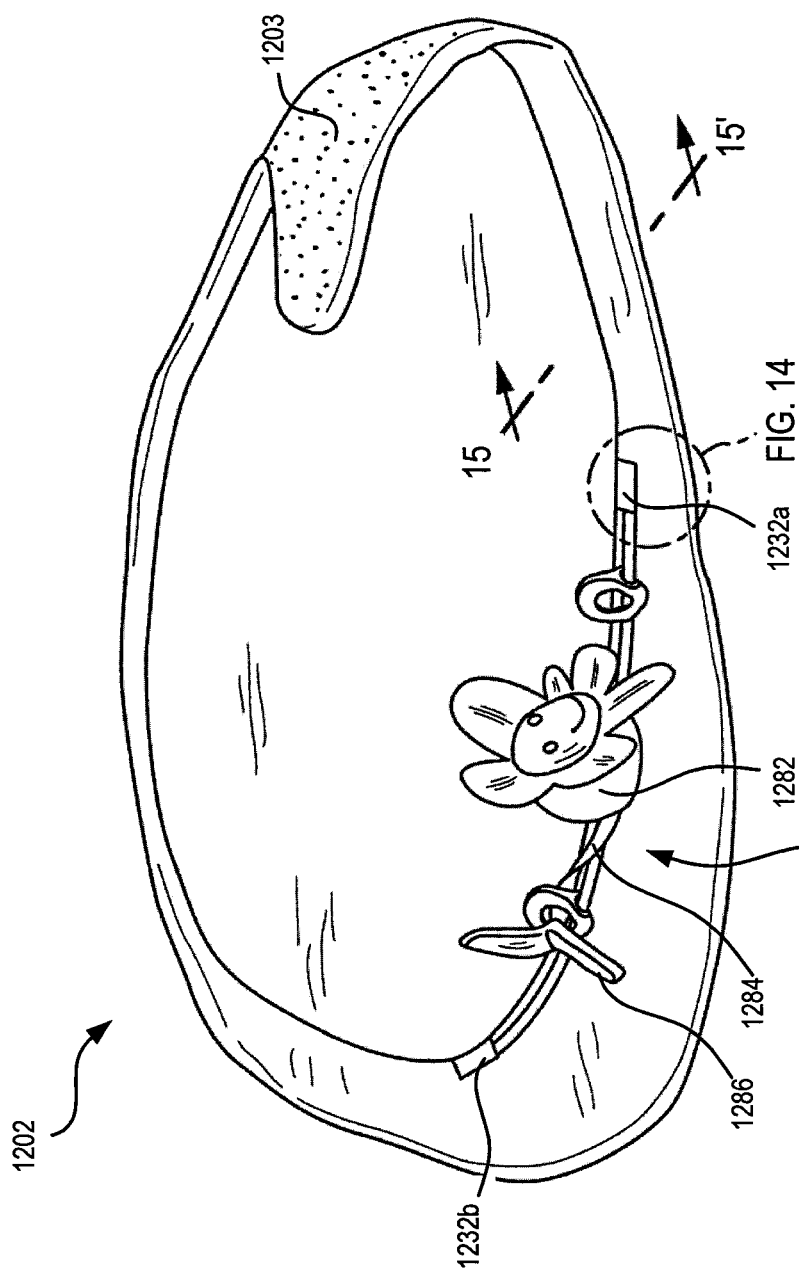
FIG. 13 shows an example play mat in accordance with the present disclosure.

FIG. 13 shows the base pad 1202, FIG. 12, with one edge turned back to show underside 1203. The underside 1203 is formed of a non-slip material that helps the base pad 1202 remain stationary as it is subjected to nominal forces exerted by, for example, a squirming baby lying upon it, inadvertent nudges from other persons and pets, etc. A line 15-15' indicates a portion of the base pad 1202 that is shown in cross-section in FIG. 15, discussed below.

Figure 14:
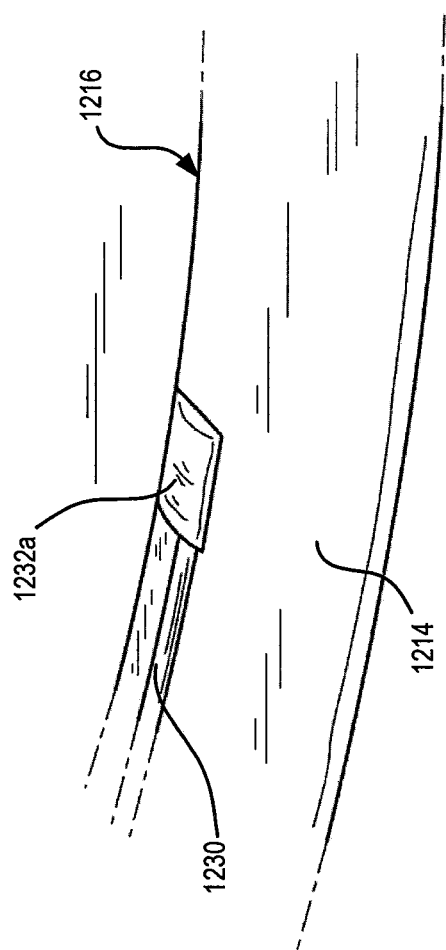
FIG. 14 shows a magnified view of one end of a track of the play mat of FIG. 13.

FIG. 14 shows a portion of the base pad 1202, enlarged to show details of the end pocket 1232*a*. The end pocket 1232*a* may be formed for example of a fabric panel stitched over an end of the rod 1230. Alternatively, the end pocket 1232*a* may be a pocket of material that encloses the end of the rod 1230, and attaches to seam 1216, arranged to allow some freedom of movement of rod 1230 relative to peripheral portion 1214, but without allowing the end of the rod 1230 to emerge from end pocket 1232*a*. Because the end of the rod 1230 is not exposed, the clip 1288 (see FIG. 12) cannot slide off of the end of the rod 1230, advantageously providing a "stop" for movement of the clip 1288 along the rod 1230 but preventing the clip 1288 from sliding off of the end of the rod 1230.

Figure 15:
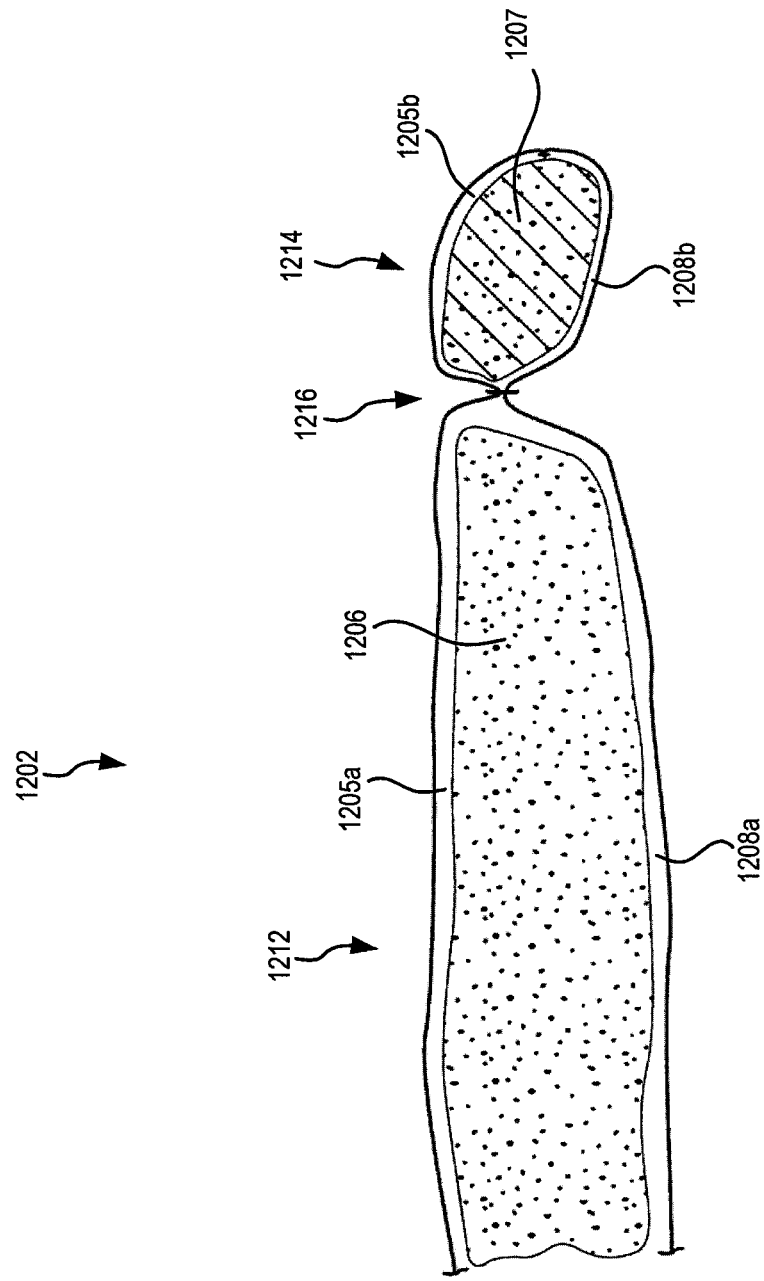
FIG. 15 shows a cross-section of a portion of the play mat of FIG. 13.

FIG. 15 is a cross-sectional view of the portion of the base pad 1202 that is denoted by line 15-15', FIG. 13. As discussed in connection with FIG. 12, base pad 1202 may include a padded center portion 1212 and a padded peripheral portion 1214; a seam 1216 may form a boundary therebetween. The padded center portion 1212 may be formed of an upper fabric portion 1205*a* and a lower fabric portion 1208*a* that enclose a padding material 1206. The peripheral portion 1214 may be formed of an upper fabric portion 1205*a* and a lower fabric portion 1208*a* that enclose a padding material 1207. Fabric portions 1205*a* and 1205*b* may be of a single piece of fabric, or may be different pieces of fabric that are stitched together at seam 1216; similarly, fabric portions 1208*a* and 1208*b* may be of a single piece of fabric, or may be different pieces of fabric that are stitched together at seam 1216. Similarly, padding materials 1206 and 1207 may be formed of a single piece of padding that is stitched through by seam 1216, or may be formed of different pieces of padding. Fabric portions 1205*a* and 1205*b* may be a soft cloth or fabric; padding materials 1206 and 1207 may be fiberfill padding or polyester batting.

FIGS. 16A-C show coupling of a flower-shaped toy 1380 with a fastener in the form of a fabric loop 1394 that is attached to a base pad of a child care equipment system (e.g., base pad 101, FIG. 1, base pad 702, FIG. 7, or base pad 1202, FIG. 12). The toy 1380 includes a main body 1382 (an object having a flower shape), a tether 1334 and a coupling member 1318 that couple with the fabric loop 1394. In this example, the coupling member 1318 consists of two submembers 1319*a*, 1319*b* (shown in a spread configuration in FIG. 16A) that are compressible by folding about a seam 1320. Coupling member 1318 couples the toy 1380 to an object (e.g., the peripheral portion 714 of the base pad 702, FIG. 8, or the peripheral portion 1214 of the base pad 1202, FIG. 13) via the tether 1334. Further, the coupling member 1318 is compressible by squeezing submembers 1319*a*, 1319*b* together such that coupling member 1318 becomes smaller than an opening presented by fabric loop 1394. An individual may compress the coupling member 1318 and push the coupling member 1318 through the fabric loop 1394. FIG. 16A shows the fabric loop 1394 proximate the coupling member 1318, with submembers 1319*a*, 1319*b* in the spread position. FIG. 16B shows the coupling member 1318 with submembers 1319*a*, 1319*b* in a compressed position and partially pushed through the fabric loop 1394. FIG. 16C shows the coupling member 1318 completely pushed through the fabric loop 1394. Coupling member 1318 is resilient such that when submembers 1319*a*, 1319*b* are released after having been pushed through fabric loop 1394, submembers 1319*a*, 1319*b* return to the spread configuration, as shown in FIG. 16C. In the condition shown in FIG. 16C, the tether 1334 is disposed within an opening formed by the fabric loop 1394 so that the main body 1382 and the coupling member 1318 are disposed on opposite sides of the fabric loop 1394. The manner in which the main body 1382 and the coupling member 1318 are coupled to the fabric loop 1394 may make it difficult for a baby or infant to decouple the same from the fabric loop 1394. However, an adult or older child, for example, could reverse the steps shown in FIGS. 16A-16C to disconnect the toy 1380 from the fabric loop 1394. Advantageously, the connection illustrated in FIGS. 16A-C may be similar to other connections that may be made in accordance with the present disclosure. For example, a similar connection may be formed by the use of "baby friendly" items that do not present sharp edges or swallowable objects.

FIGS. 17-21 illustrate additional details of how a track may be attached to a piece of child care equipment, for example play gym 100, FIG. 1, or play gym 700, FIG. 7.

Figure 17:
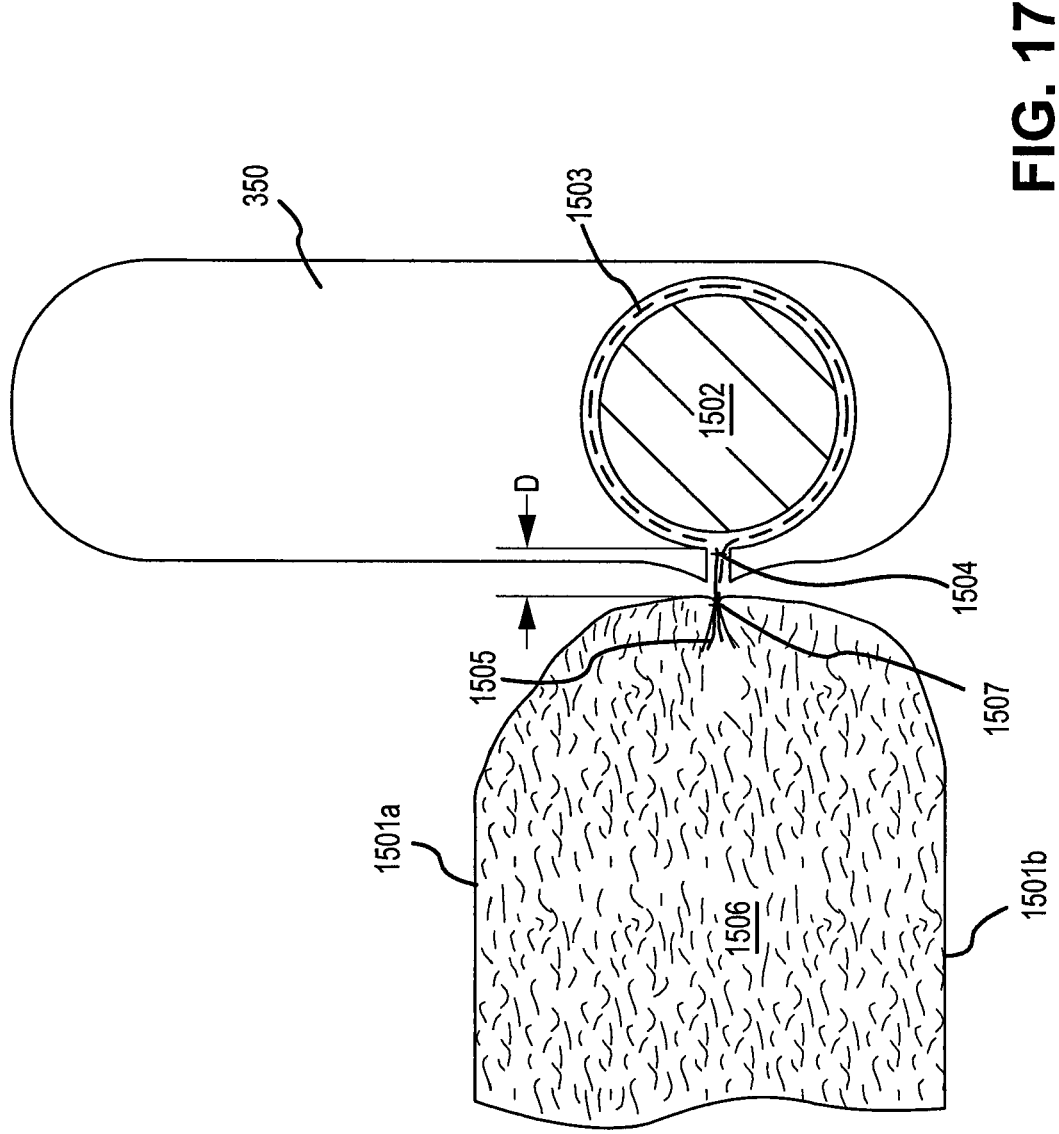
FIG. 17 illustrates an embodiment of attaching a track at a seam of a piece of child care equipment.

FIG. 17 shows one way of attaching a track at a seam in a piece of child care equipment having a shell with two layers 1501*a* and 1501*b*. In this view, a rod or welt 1502 is shown in cross section, and serves as a track. For example, welt 1502 may be made of extruded, foam, plastic, or rubber. Rod or welt 1502 is wrapped in a sleeve 1503, shown in dashed lines. As is described above, sleeve 1503 may be made of a material having good durability and strength, for example nylon or another suitable material. Preferably, sleeve 1503 is sewn along stitching line 1504 to snugly capture rod or welt 1502 within sleeve 1503, leaving two layers of sleeve 1503 protruding to form a tab 1505.

In this example, the shell is made in two layers 1501*a* and 1501*b*, with a padding or fill material 1506 between them. During construction, the edges of layers 1501*a* and 1501*b* may be generally aligned with the edge of tab 1505, and the four thicknesses of materials (layers 1501*a* and 1501*b*, and two thicknesses of sleeve 1503) sewn together along stitching line 1507. It may be convenient to make the attachment of sleeve 1503 to the shell with the shell "inside out". Once the shell is nearly complete, it may be turned "outside out" and filled with padding or fill material 1506. In this way, any edges of layers 1501*a* and 1501*b* and sleeve 1503 that might be subject to fraying are inside the finished product. A clip 350 or other clip according to embodiments of the invention may be engaged with rod or welt 1502, and the ends of sleeve 1503 addressed to capture rod 1502 longitudinally. Alternatively, rather than sewing sleeve 1503 and layers 1501*a* and 1501*b* together in a single operation, rod or welt 1502 wrapped in sleeve 1503 may be sewn to either layer 1501*a* or 1501*b* in one operation, and then to the other layer in a later operation, so that there may be three stitching lines at a particular seam.

Rod or welt 1502 is preferably spaced from the body of the child care equipment by a distance D that is sufficient to enable clip 350 to slide freely without catching on layer 1501*a* or layer 1501*b*. For example, spacing D may be about 1/16 inch to about 1/4 inch, or more preferably about 1/8 inch to about 3/16 inch.

Figure 18:
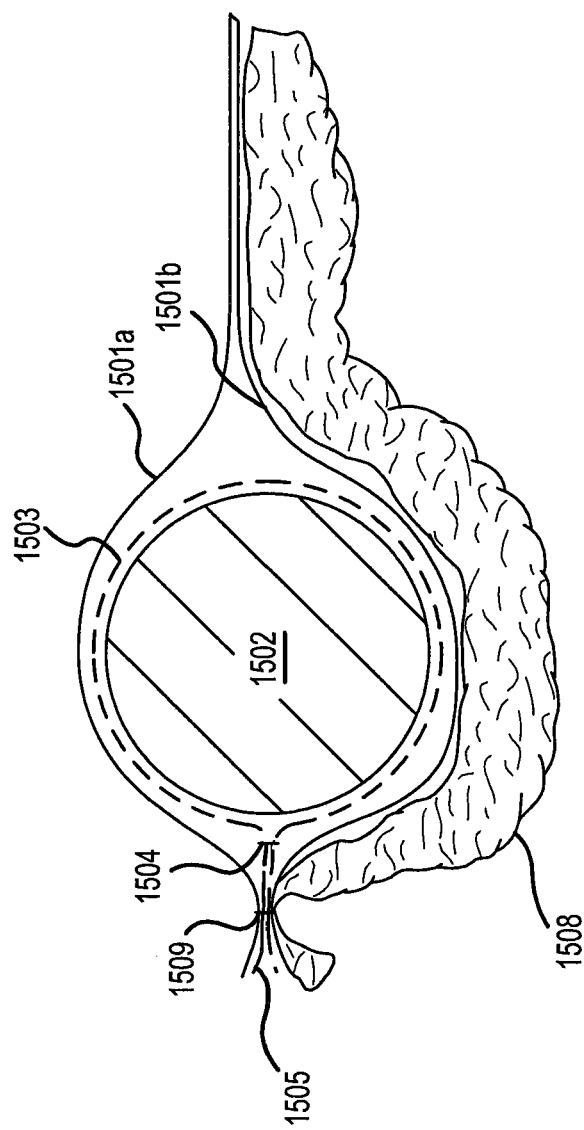
FIG. 18 illustrates an embodiment of attaching a track at a seam of a piece of child care equipment.
Figure 19:
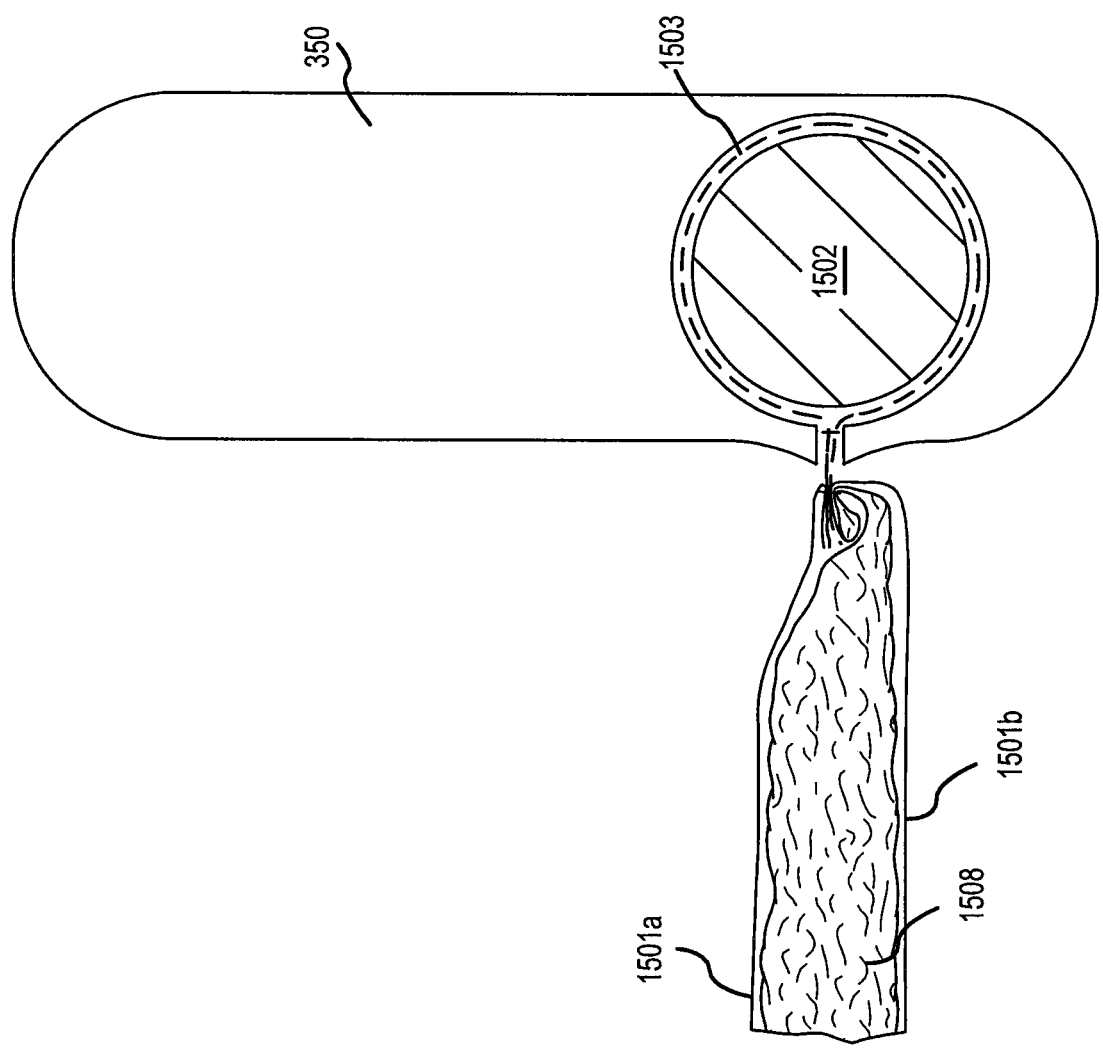
FIG. 19 illustrates an embodiment of attaching a track at a seam of a piece of child care equipment.

FIGS. 18 and 19 show another way of attaching a track to a piece of child care equipment, in accordance with other embodiments of the invention. The technique of FIGS. 18 and 19 may be especially useful for construction of items that are generally flat but include padding, for example play pads, liners for shopping carts or strollers, or other similar items.

In FIG. 18, a rod or welt 1502 has been previously wrapped in sleeve 1503 and sleeve 1503 sewn along stitching line 1504 to capture rod or welt 1502. Shell layers 1501*a* and 1501*b* are then stacked together with tab 1505 of sleeve 1503. In addition, a layer of sheet batting or other padding 1508 is also stacked together with tab 1505 and shell layers 1501*a* and 1501*b*. In this configuration, the sides of layers 1501*a* and 1501*b* that will form the outside of the product are facing each other. The combined shell layers 1501*a* and 1501*b*, tab 1505 of sleeve 1503, and padding 1508 are stitched together along stitching line 1509, which may extend along a portion or nearly all of the perimeter of the product. The stitching operation is preferably done with the product "inside out", and a small portion of the perimeter of the product is left unsewn, to allow for turning the product "outside out".

FIG. 19 shows the arrangement of layers once the product is turned "outside out" and a clip 350 is attached. The small previously unsewn portion of the product perimeter may then be finished with outside stitching or other finishing. A clip such as clip 350 is assembled onto the track at any suitable stage of the process, but preferably before the ends of the track are fully finished.

Figure 20:
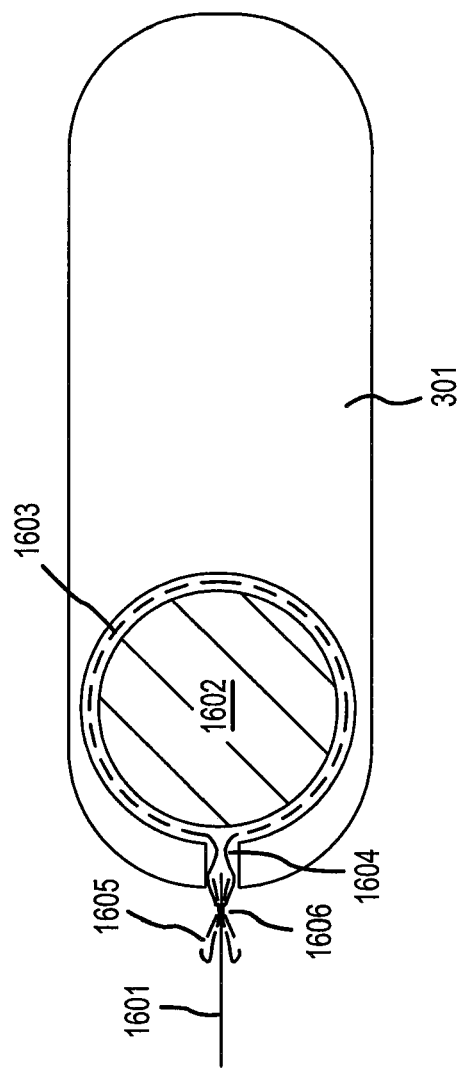
FIG. 20 illustrates an embodiment of attaching a track at an edge of a single-thickness piece of child care equipment.

FIG. 20 shows one way of attaching a track at an edge of a piece of child care equipment having a single layer of material 1601. In this view, a rod or welt 1602 is shown in cross section, and serves as a track. Rod or welt 1602 is wrapped in a sleeve 1603, shown in dashed lines. Preferably, sleeve 1603 is sewn along stitching line 1604 to snugly capture rod or welt 1602 within sleeve 1603, leaving two layers of sleeve 1603 protruding to form a tab 1605. Each of the two layers of tab 1605 may then be folded under, and the single layer of material 1601 inserted between them, and the five resulting layers of material sewn together along stitching line 1606. In this way, any edges of material 1601 or sleeve 1603 that might be subject to fraying are captured and hidden within tab 1605, between stitching lines 1604 and 1606. Alternatively, sleeve 1603 could be made of a self-edged material, and material 1601 simply sewn between the two thicknesses of tab 1605, leaving the edges of sleeve 1603 exposed. A clip 301 or other clip according to embodiments of the invention may be engaged with rod or welt 1602, and the ends of sleeve 1603 addressed to capture rod or welt 1602 longitudinally. It will be recognized that this technique could also be used to attach a track at an edge of a piece of child care equipment having multiple layers capable of being captured within tab 1605.

Figure 21:
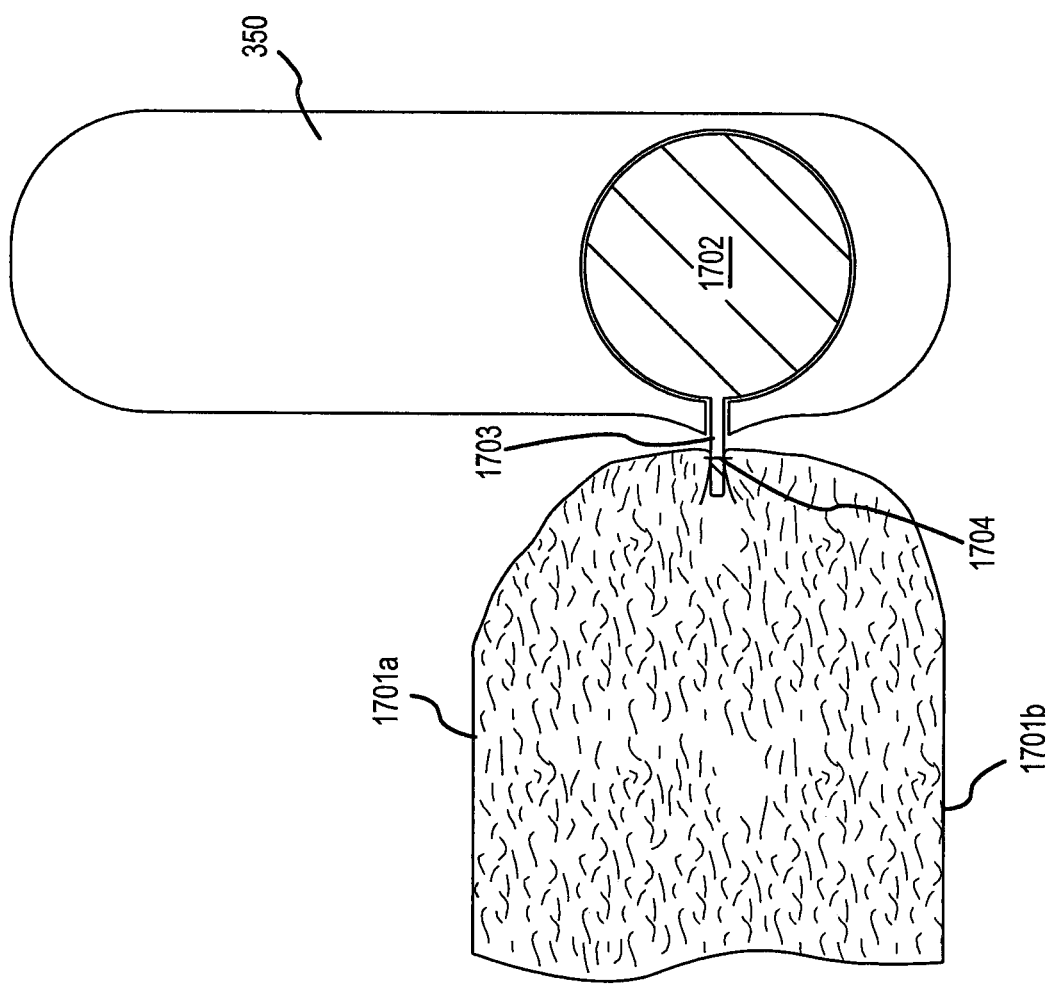
FIG. 21 shows another way of attaching a track to a piece of child care equipment, in accordance with embodiments of the invention.

FIG. 21 shows another way of attaching a track to a piece of child care equipment having a shell with two layers 1701*a* and 1701*b*. In this view, a welt 1702 is shown in cross section, and serves as the track. Welt 1702 is extruded, for example of foam, plastic, or rubber, to include an integrally formed flange 1703. Flange 1703 may be used to attach welt 1702 to layers 1701*a* and 1701*b* by sewing flange 1703 into the seam between layers 1701*a* and 1701*b*. The sewing may be done simultaneously, such as along stitching line 1704 capturing layers 1701*a* and 1701*b* and flange 1703 in a single pass, or flange 1703 may be sewn to the layers one at a time. Flange 1703 enables welt 1702 to be attached without being wrapped in a sleeve. The main portion of welt 1702 (to which flange 1703 is connected), could be hollow, for example forming a tube with an opening along its length, or may be fully formed of the welt material, without any hollow portion. It will be recognized that welt 1702 having flange 1703 could also be attached to a single layer shell, or to a multiple-layer shell with both layers on the same side of flange 1703. Many other configurations are possible. Welt 1702 having a flange 1703 may replace a sleeve-wrapped welt or rod in any suitable application, for example the applications shown in any of the Figures.

Figure 22B:
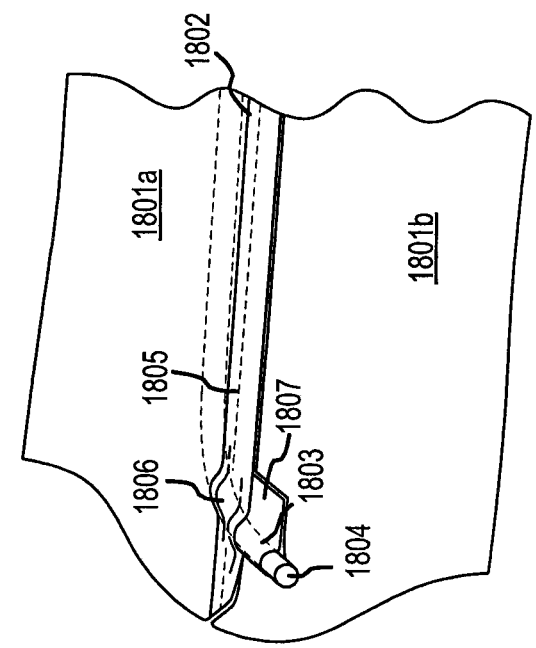
FIGS. 22A and 22B illustrate one way of capturing the ends of a piece of foam welt in a seam, in accordance with embodiments of the invention.
Figure 22A:
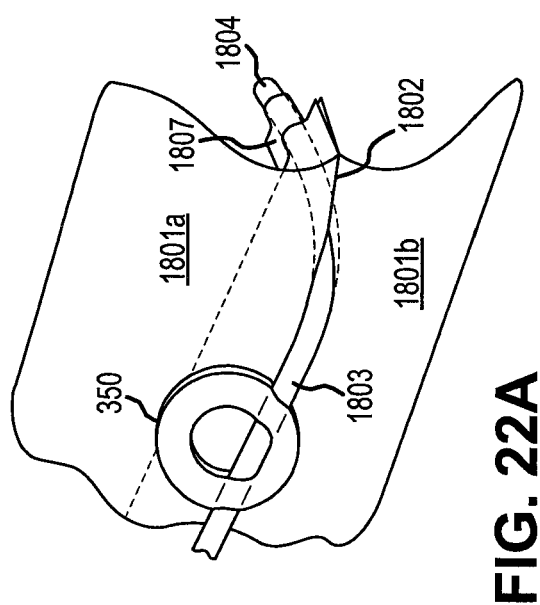

FIGS. 22A and 22B show a way of capturing the ends of a piece of welt in a seam between two fabric or other flexible layers 1801*a* and 1801*b*. FIG. 22A shows the assembly from the finished side of the seam, such as the outside of a product, and FIG. 22B shows the assembly from the unfinished side of the seam, such as would be found on the inside of a product. Layers 1801*a* and 1801*b* are joined along seam 1802. For much of the seam visible in FIGS. 22A and 22B, a track 1803 is sewn into seam 1802, for example by wrapping a piece of welt in a fabric sleeve 1807 and sewing the sleeve into seam 1802 as described above. At a point where it is desired that track 1803 ends, track 1803 is turned inward, so that end 1804 of track 1803 will reside inside the finished product. Stitching 1805 is simply continued across track 1803 to capture track 1803 securely in seam 1802. The point at which track 1803 is turned inward also provides a stop that prevents a clip such as clip 350 from sliding past that point, and/or from coming off of track 1803. If desired, multiple stitching passes 1806 may be made over track 1803 to lend strength to the connection.

FIGS. 23A and 23B schematically illustrate a method of forming a coupling 724*b* that joins legs of a canopy (e.g., canopy 102 or canopy 704 as described herein). Coupling 724*b* may be formed at low cost by jointly forming legs 722*a*, 722*b* and 722*c* with one or more common center rods or wires, and affixing ends of outer sheathing (such as a foam material) of such legs with a material such as heat-shrink tubing or an adhesive tape. Elements of FIGS. 23A and 23B are not necessarily drawn to scale, but illustrate relationships among elements that form coupling 724*b*.

In FIG. 23A, leg 722*a* is shown as sheathing 725*a* that partially envelops two wires 723*a*, 723*b*. At an end of sheathing 725*a*, wire 723*a* continues into a leg 722*b* and wire 723*b* continues into a leg 722*c*, where each of the respective wires are partially enveloped by sheathing 725*b* and 725*c*. A section of a connector material 727 is schematically shown as surrounding ends of legs 722*a*, 722*b* and 722*c* where coupling 724*b* is to be formed; section 727 is shown as transparent for clarity of illustration. In an embodiment, connector material 727 may be heat-shrink tubing (shown in an unshrunk state in FIG. 23A); alternatively, a length of adhesive tape may be wrapped around ends of legs 722*a*, 722*b* and 722*c* as connector material 727. Also, it will be appreciated that the legs 722*a*, 722*b* and 722*c* may also be covered or enveloped with a cloth of other fabric that covers the sheath and wire.

In FIG. 23B, coupling 724*b* is schematically shown as completed. Relative to the condition illustrated in FIG. 23A, connector material 727' is shown as tightly conforming about ends of legs 722*a*, 722*b* and 722*c* to hold the legs together (e.g., as expected if connector material 727' is heat-shrink tubing in its shrunken state, or tightly wrapped adhesive tape). Wire 723*b* and sheathing 725*c* corresponding to leg 722*c* are bent just past the edge of connector material 727', so that the overall form of legs 722*a*, 722*b* and 722*c*, as coupled, resembles a T-shape. In the illustrated embodiment, wire 723*b* that forms the core of leg 725*c* is ductile enough to be bent as shown, but also rigid enough to retain its shape once bent, so that legs 722*a*, 722*b* and 722*c* form the T-shape. However, other embodiments may utilize different materials, and/or may be joined to form different shapes or. Legs may include not only one or two, but more than two wires or rods, may be joined in different numbers and may form different combinations than shown in FIGS. 23A and 23B. As noted, elements in FIGS. 23A and 23B are not necessarily drawn to scale, and it is appreciated that materials, sizes and lengths of wires 723, sheathing 725 and connector material 727, 727' may be chosen to provide appropriate size, weight and other mechanical properties for a given embodiment. Also, an aesthetically pleasing fabric may be placed about the legs.

The invention has now been described in detail for the purposes of clarity and understanding. However, those skilled in the art will appreciate that certain changes and modifications may be practiced within the scope of the appended claims.

What is claimed is:

1. A child care equipment system, comprising:
a mat comprising a top fabric layer, and a bottom fabric layer, and a thin layer of a cushion material enclosed by the top fabric layer and the bottom fabric layer, wherein the mat has a top surface and bottom surface, wherein the bottom surface is configured to be placed on a floor and the top surface is sized and configured to receive a baby when lying on the top surface of the mat;
a single flexible rod-like element that has a length, a first end surface, a second end surface, and an outer surface with a substantially continuous periphery, wherein the first end surface and the second end surface are separated by the length and are on opposite ends of the rod-like element, and the rod-like element is fixedly coupled to a portion of the top surface of the mat along the length between the opposite ends of the rod-like element;
a slidable member having a slot that is slidingly coupled with only the single rod-like element and unattached with the mat such that the slidable member may be moved along the rod-like element by sliding the slidable member along the rod-like element, wherein the slidable member defines an opening to permit an article to be coupled to the slidable member by passing the article through the opening and securing the article to the slidable member; and
at least one article that includes a first item coupled to a second item by a length of material, wherein the first item is resilient so that the article is coupled to the slidable member when the first item is compressed and passed through an opening of the slidable member so that at least a portion of the length of material is positioned within the opening and the first and second items are on opposite sides of the slidable member.

2. The system of claim 1, wherein the first item is a ball-like padded item enclosed by fabric and is compressible to a size smaller than the opening so that when the first item is compressed and passed through the opening the first item and the second item are exposed on opposite sides of the opening.

3. The system of claim 1, wherein the first item is a padded item enclosed by fabric and is elongate in geometry, wherein the padded item is compressible to a size smaller than the opening by folding the padded item to permit the first item to be passed through the opening, with the first item and the second item being positioned on opposite sides of the opening.

4. The system of claim 1, wherein the first item has a shape selected from the group consisting of: a shape of a ball; a shape of a block; a shape of a pyramid; a shape of a button; a shape of a tree leaf; a shape of a flower; a shape of an animal; and a shape of a wing.

5. The system of claim 1, wherein the top surface comprises a first fabric and a second fabric that are coupled together to form a seam, and wherein the rod-like element is coupled to the top surface at the seam so as to project above the top surface at the seam.

6. The system of claim 5, wherein at least a portion of the seam is curved, and wherein the rod-like element is curved to match the curve of the seam.

7. The system of claim 1, further comprising a fabric covering the rod-like element.

8. The system of claim 1, further comprising a pillow that has at least one flexible loop coupled thereto, wherein the loop is sized to receive the article when the first item is compressed and passed through an opening of the loop so that at least a portion of the length of material is positioned within the opening of the loop.

9. The system of claim 1, wherein the article is selected from the group consisting of: a toy; a doll; a ball; a mirror; a block; a pyramid; a teething ring; a toy shaped like an animal or insect; a toy shaped like a plant or flower; an item that generates sound; an item that generates vibration; and an item that generates light.

10. The system of claim 1, further comprising at least one flexible loop coupled to the mat, wherein the loop is configured to receive the article when the first item is compressed and passed through an opening of the loop so that at least a portion of the length of material is positioned within the opening of the loop.

11. A play mat, comprising:
a thin mat body comprising a top fabric layer and a bottom fabric layer that encases a batting material;
a rod-like element that has a length defined between ends of the rod-like element, and an outer surface with a substantially continuous periphery, and that is encased along the length by a fabric that is connected along the length of the rod-like element to the top fabric layer; and
a slidable member defining an opening and a slot, wherein the slot has a surface in contact with the second fabric such that the slidable member is slidingly engaged with the rod-like element, and wherein the opening permits an article to be coupled to the slidable member by passing the article through the opening and securing the article to the slidable member.

12. The play mat of claim 11, further comprising a first pocket and a second pocket each fixedly coupled to a particular portion of the play mat, wherein a first end of the rod-like element is positioned within the first pocket and a second end of the rod-like element is positioned within the second pocket.

13. The play mat of claim 11, further comprising a seam formed within a top surface of the play mat that separates the play mat into a first portion and a second portion, and wherein the rod-like element is coupled to the top surface of the play mat along the seam.

14. The play mat of claim 11, wherein the rod-like element is formed from one of a plastic material or a metallic material.

15. The play mat of claim 11, wherein the slidable member is formed from a plastic material.

16. A play mat, comprising:
a thin mat body comprising a top fabric layer and a bottom fabric layer that encases a batting material;
a first and second pocket each fixedly coupled to the top fabric layer;
a rod that has a length defined between first and second end surfaces that are on opposite ends of the rod, and an outer surface with a substantially continuous periphery, wherein the rod is connected along the length between the opposite ends to the top fabric layer, and a first end of the opposite ends is positioned within the first pocket and a second end of the opposite ends is positioned within the second pocket; and
a slidable member including an opening and a slot, wherein the rod is positioned within the slot so that the slidable member is slidingly engaged with the rod, and wherein the opening is sized to permit an article to be coupled to the slidable member by passing the article through the opening and securing the article to the slidable member; and
wherein the play mat has a top surface and a bottom surface, wherein the top surface includes at least one a seam formed by stitching, and wherein the rod is coupled to the top surface at the seam so as to project above the top surface at the seam.

17. The play mat of claim 16, further comprising a polyester or cloth fabric covering the rod.

18. The play mat of claim 16, further comprising:
at least one article that includes a first item coupled to a second item by a length of material, wherein the first item is resilient so that the article is coupled to the slidable member when the first item is compressed and passed through an opening of the slidable member so that at least a portion of the length of material is positioned within the opening and the first and second items are on opposite sides of the slidable member.

19. A child care equipment system, comprising:
a mat comprising a top fabric layer, and a bottom fabric layer, and a thin layer of a cushion material enclosed by the top fabric layer and the bottom fabric layer, wherein the mat has a top surface and bottom surface, wherein the bottom surface is configured to be placed on a floor and the top surface is sized and configured to receive a baby when lying on the top surface of the mat;
a single flexible rod-like element that has a length, a first end surface, a second end surface, and an outer surface with a substantially continuous periphery, wherein the first end surface and the second end surface are separated by the length and are on opposite ends of the rod-like element, and the rod-like element is fixedly coupled to a portion of the top surface of the mat along the length between the opposite ends of the rod-like element; and
a slidable member having a slot that is slidingly coupled with only the single rod-like element and unattached with the mat such that the slidable member may be moved along the rod-like element by sliding the slidable member along the rod-like element, wherein the slidable member defines an opening to permit an article to be coupled to the slidable member by passing the article through the opening and securing the article to the slidable member; and
wherein the top surface comprises a first fabric and a second fabric that are coupled together to form a seam, and wherein the rod-like element is coupled to the top surface at the seam so as to project above the top surface at the seam.

20. A play mat, comprising:
a thin mat body comprising a top fabric layer and a bottom fabric layer that encases a batting material;
a first and second pocket each fixedly coupled to the top fabric layer;
a rod that has a length defined between first and second end surfaces that are on opposite ends of the rod, and an outer surface with a substantially continuous periphery, wherein the rod is connected along the length between the opposite ends to the top fabric layer, and a first end of the opposite ends is positioned within the first pocket and a second end of the opposite ends is positioned within the second pocket; and
a slidable member including an opening and a slot, wherein the rod is positioned within the slot so that the slidable member is slidingly engaged with the rod, and wherein the opening is sized to permit an article to be coupled to the slidable member by passing the article through the opening and securing the article to the slidable member; and
at least one article that includes a first item coupled to a second item by a length of material, wherein the first item is resilient so that the article is coupled to the slidable member when the first item is compressed and passed through an opening of the slidable member so that at least a portion of the length of material is positioned within the opening and the first and second items are on opposite sides of the slidable member.

* * * * *